US011431239B2

(12) United States Patent
Kaneko et al.

(10) Patent No.: US 11,431,239 B2
(45) Date of Patent: Aug. 30, 2022

(54) POWER CONVERTER

(71) Applicant: TOSHIBA MITSUBISHI-ELECTRIC INDUSTRIAL SYSTEMS CORPORATION, Chuo-ku (JP)

(72) Inventors: Kazuhide Kaneko, Tokyo (JP); Haruyuki Yamaguchi, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 111 days.

(21) Appl. No.: 17/056,888

(22) PCT Filed: Jul. 25, 2018

(86) PCT No.: PCT/JP2018/027892
§ 371 (c)(1),
(2) Date: Nov. 19, 2020

(87) PCT Pub. No.: WO2020/021655
PCT Pub. Date: Jan. 30, 2020

(65) Prior Publication Data
US 2021/0218326 A1 Jul. 15, 2021

(51) Int. Cl.
*H02M 1/32* (2007.01)
*H02M 5/458* (2006.01)
(Continued)

(52) U.S. Cl.
CPC ........... *H02M 1/32* (2013.01); *H02M 5/4585* (2013.01); *H02M 7/003* (2013.01); *H02M 7/487* (2013.01)

(58) Field of Classification Search
CPC ...... H02M 1/32; H02M 5/4585; H02M 7/003; H02M 7/487
(Continued)

(56) References Cited

U.S. PATENT DOCUMENTS 6,028,779 A * 2/2000 Sakamoto ............. H02M 7/003 363/55
8,111,530 B2 * 2/2012 Ono ...................... H02M 7/487 363/56.01
(Continued)

FOREIGN PATENT DOCUMENTS

JP 2015-89185 A 5/2015
JP 2016-158450 A 9/2016
(Continued)

OTHER PUBLICATIONS

Received STIC search report from EIC 2800 searcher Steve Chung, Chickasaw for claim 2 on Nov. 3, 2021. (Year: 2021).*
(Continued)

*Primary Examiner* — Shawki S Ismail
*Assistant Examiner* — Htet Z Kyaw
(74) *Attorney, Agent, or Firm* — Oblon, McClelland, Maier & Neustadt, L.L.P.

(57) ABSTRACT

A power converter according to an embodiment is provided with first to fourth modules, first and second clamp diodes, and first and second buses. The first bus has a first main portion and a first standing portion provided in the first main portion. The first main portion electrically connects the first switching module and the second switching module, and is electrically connected to the first clamp diode. The second bus has a second main portion and a second standing portion provided in the second main portion. The second main portion electrically connects the third switching module and the fourth switching module, and is electrically connected to the second clamp diode. The second standing portion faces the first standing portion.

5 Claims, 14 Drawing Sheets

(51) Int. Cl.
*H02M 7/00* (2006.01)
*H02M 7/487* (2007.01)

(58) Field of Classification Search
USPC ........................................................ 363/37
See application file for complete search history.

(56) References Cited

U.S. PATENT DOCUMENTS

| | | | | |
|---|---|---|---|---|
| 2009/0219696 | A1* | 9/2009 | Nakayama | H02M 7/003 361/709 |
| 2014/0111959 | A1* | 4/2014 | Li | H02M 7/487 174/68.2 |
| 2014/0254228 | A1* | 9/2014 | Ying | H02M 7/5387 363/132 |

FOREIGN PATENT DOCUMENTS

| | | | |
|---|---|---|---|
| JP | 2018-59803 | A | 4/2018 |
| WO | WO 01/31771 | A1 | 5/2001 |

OTHER PUBLICATIONS

Received STIC search report from EIC 2800 searcher Salim Alam for claim 7 on Nov. 3, 2021. (Year: 2021).*
Received STIC search report from EIC 2800 searcher Salim Alam for claim 8 on Nov. 2, 2021. (Year: 2021).*
International Search Report dated Aug. 21, 2018 in PCT/JP2018/027892 filed on Jul. 25, 2018, 2 pages.
Office Action dated Mar. 23, 2021 in corresponding Indian Patent Application No. 202017050280 (with English Translation), 6 pages.

* cited by examiner

POWER CONVERTER

TECHNICAL FIELD

Embodiments of the present invention relates to a power converter.

BACKGROUND ART

As one of power converters, a neutral point clamped type power converter is known. The neutral point clamped type power converter includes, for example, four switching elements electrically connected in series with each other, four freewheeling diodes connected in inverse parallel with respect to the four switching elements, and two clamp diodes.

By the way, the power converter is expected to have a large capacity. However, in a case where the capacity of the power converter is increased, a surge voltage at the time of switching may increase due to an increase in the energizing current or an increase in the wiring inductance.

CITATION LIST

Patent Literature

[Patent Literature 1]
Japanese Unexamined Patent Application, First Publication No. 2016-158450

SUMMARY OF INVENTION

Technical Problem

An object of the present invention is to provide a power converter which is able to reduce a surge voltage.

Solution to Problem

A power converter according to an embodiment is a neutral point clamped type power converter, and includes first to fourth switching modules, a first clamp diode, a second clamp diode, a first bus, and a second bus. The first to fourth switching modules are electrically connected in series with each other in the order of the first switching module, the second switching module, the third switching module, and the fourth switching module from a positive electrode to a negative electrode. Each of the first switching module, the second switching module, the third switching module, and the fourth switching module includes a switching element, a package containing the switching element, a first terminal, and a second terminal, the first terminal being electrically connected to a collector of the switching element and exposed to an outside of the package, the second terminal being electrically connected to an emitter of the switching element and exposed to the outside of the package. The package of the second switching module and the package of the third switching module is arranged side by side. An anode of the first clamp diode is connected to a neutral point of the power converter. A cathode of the second clamp diode is connected to the neutral point of the power converter. The first bus includes a first main portion and a first standing portion. The first main portion electrically connects the second terminal of the first switching module and the first terminal of the second switching module, and is connected to a cathode of the first clamp diode. The first standing portion is provided in an end of the first main portion, and stands up with respect to the first main portion. The second bus includes a second main portion and a second standing portion. The second main portion electrically connects the second terminal of the third switching module and the first terminal of the fourth switching module, and is electrically connected to an anode of the second clamp diode. The second standing portion is provided in an end of the second main portion, stands up with respect to the second main portion, and faces the first standing portion of the first bus.

DESCRIPTION OF EMBODIMENTS

Figure 1:
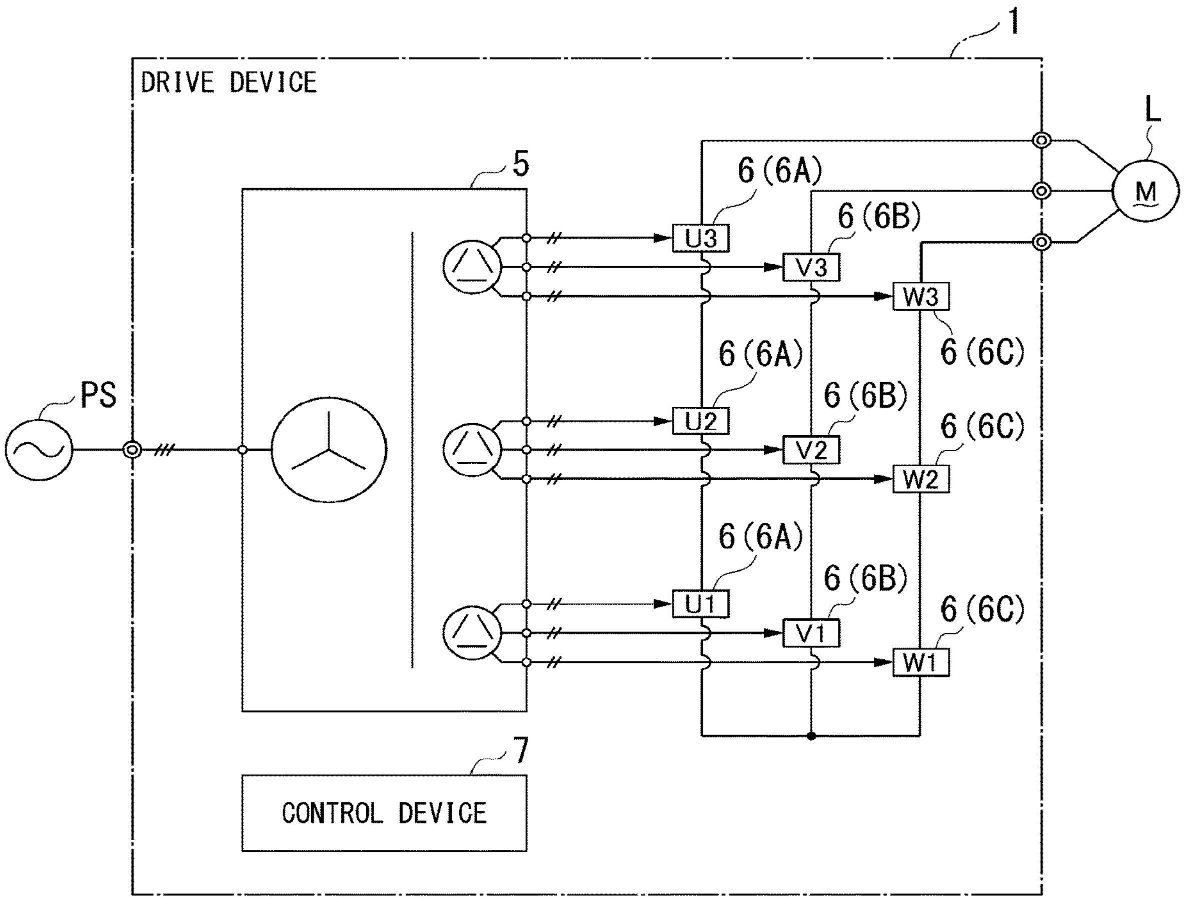
FIG. 1 is a diagram showing an example of a drive device of an embodiment.

Hereinafter, a power converter of an embodiment is described with reference to drawings. In the following description, constituents having the same or similar functions are designated by the same reference numerals. Redundant description of such constituents may be omitted. In the drawings referred to below, illustration of gate wirings and gate terminals for control, or the like may be omitted for convenience of explanation.

Here, a "positive electrode P", a "negative electrode N", and a "neutral point C" are defined first. The "positive electrode P" means a portion which has a positive potential when the power converter is operated. The "negative electrode N" means a portion which has a negative potential when the power converter is operated. The "neutral point C" means a portion which has an intermediate potential (a neutral point potential) between the positive electrode P and the negative electrode N in the neutral point clamped type (NPC type) power converter when the power converter is operated.

The drive device (an electric motor drive device) 1 according to an embodiment will be described with reference to FIGS. 1 to 13. The drive device 1 is an example of the "power converter." However, the "power converter" is not limited to a device which includes both of a converter and an inverter, and may be has function of at least one of the converter and the inverter.

For example, the drive device 1 converts AC power supplied from a three-phase AC power source PS into AC power which has a desired frequency and voltage and supplies the AC power to a load L. The load L is, for example, an electric motor but is not limited thereto. In the embodiment, an example in which the drive device 1 includes a plurality of single-phase cell units 6 will be described. The drive device 1 may include a three-phase converter and a three-phase inverter instead of the plurality of single-phase cell units 6.

1. Electrical Configuration

1.1 Overall Configuration

First, an electrical overall configuration of the drive device 1 will be described. FIG. 1 is a diagram showing an example of the drive device 1. The drive device 1 includes, for example, an input transformer 5, a plurality of single-phase cell units 6, and a control device 7.

The input transformer 5 has a three group configuration in which the primary side has a three-phase star connection and the secondary side has a three-phase open delta connections which are insulated from one another. A three-phase AC power is supplied from the AC power source PS to the input transformer 5. The input transformer 5 transforms the supplied AC power into a desired voltage, and supplies the transformed AC power to each of the plurality of single-phase cell units 6.

Each of the single-phase cell units 6 converts the AC power supplied from the secondary winding of the input transformer 5 into DC power, converts the converted DC power into AC power having a desired frequency and voltage, and then outputs the AC power. In the embodiment, the plurality of single-phase cell units 6 includes three first-phase single-phase cell units 6A (U1, U2, U3), three second-phase single-phase cell units 6B (V1, V2, V3), and three third-phase single-phase cell units 6C (W1, W2, W3).

Each single-phase cell unit 6 has the same circuit configuration.

A first phase of a first group of the secondary side of the input transformer 5 is connected to the input of the single-phase cell unit U1. A second phase of the first group of the secondary side of the input transformer 5 is connected to the input of the single-phase cell unit V1. A third phase of the first group of the secondary side of the input transformer 5 is connected to the input of the single-phase cell unit W1.

The first phase of a second group of the secondary side of the input transformer 5 is connected to the input of the single-phase cell unit U2. The second phase of the second group of the secondary side of the input transformer 5 is connected to the input of the single-phase cell unit V2. The third phase of the second group of the secondary side of the input transformer 5 is connected to the input of the single-phase cell unit W2.

The first phase of a third group of the secondary side of the input transformer 5 is connected to the input of the single-phase cell unit U3. The second phase of the third group of the secondary side of the input transformer 5 is connected to the input of the single-phase cell unit V3. The third phase of the third group on the secondary side of the input transformer 5 is connected to the input of the single-phase cell unit W3.

Outputs of the three first-phase single-phase cell units U1, U2, and U3 are connected in series in this order. The three second-phase single-phase cell units V1, V2, and V3 are connected in series in the same manner, and the three third-phase single-phase cell units W1, W2, and W3 are connected in series in the same manner.

An output of the single-phase cell unit U1 on the side not connected to the single-phase cell unit U2, an output of the single-phase cell unit V1 on the side not connected to the single-phase cell unit V2, and an output of the single-phase cell unit W1 on the side not connected to the single-phase cell unit W2 are connected to one another to form the neutral point of the three-phase AC current of a load circuit.

An output of the single-phase cell unit U3 on the side not connected to the single-phase cell unit U2 is connected to the first phase of the load L. An output of the single-phase cell unit V3 on the side not connected to the single-phase cell unit V2 is connected to the second phase of the load L. An output of the single-phase cell unit W3 on the side not connected to the single-phase cell unit W2 is connected to the third phase of the load L.

The control device 7 controls the plurality of single-phase cell units 6. For example, the control device 7 controls each of the single-phase cell units 6 by transmitting signals for controlling switching elements included in each of the single-phase cell units 6 based on information indicating phase voltages of the AC power detected by voltage detectors that are not shown. With such a configuration, the drive device 1 can convert the AC power supplied from the three-phase AC power supply PS into three-phase AC power having a desired frequency and a desired voltage and supply it to the load L.

1.2 Single-Phase Cell Unit

1.2.1 Overall Configuration of Single-Phase Cell Unit

Next, the single-phase cell unit 6 will be described. Here, the first single-phase cell unit 6A, the second single-phase cell unit 6B, and the third single-phase cell unit 6C are substantially the same as one another except that the phases of the AC power are different. Therefore, hereinafter, the first single-phase cell unit 6A will be described as a representative of them.

Figure 2:
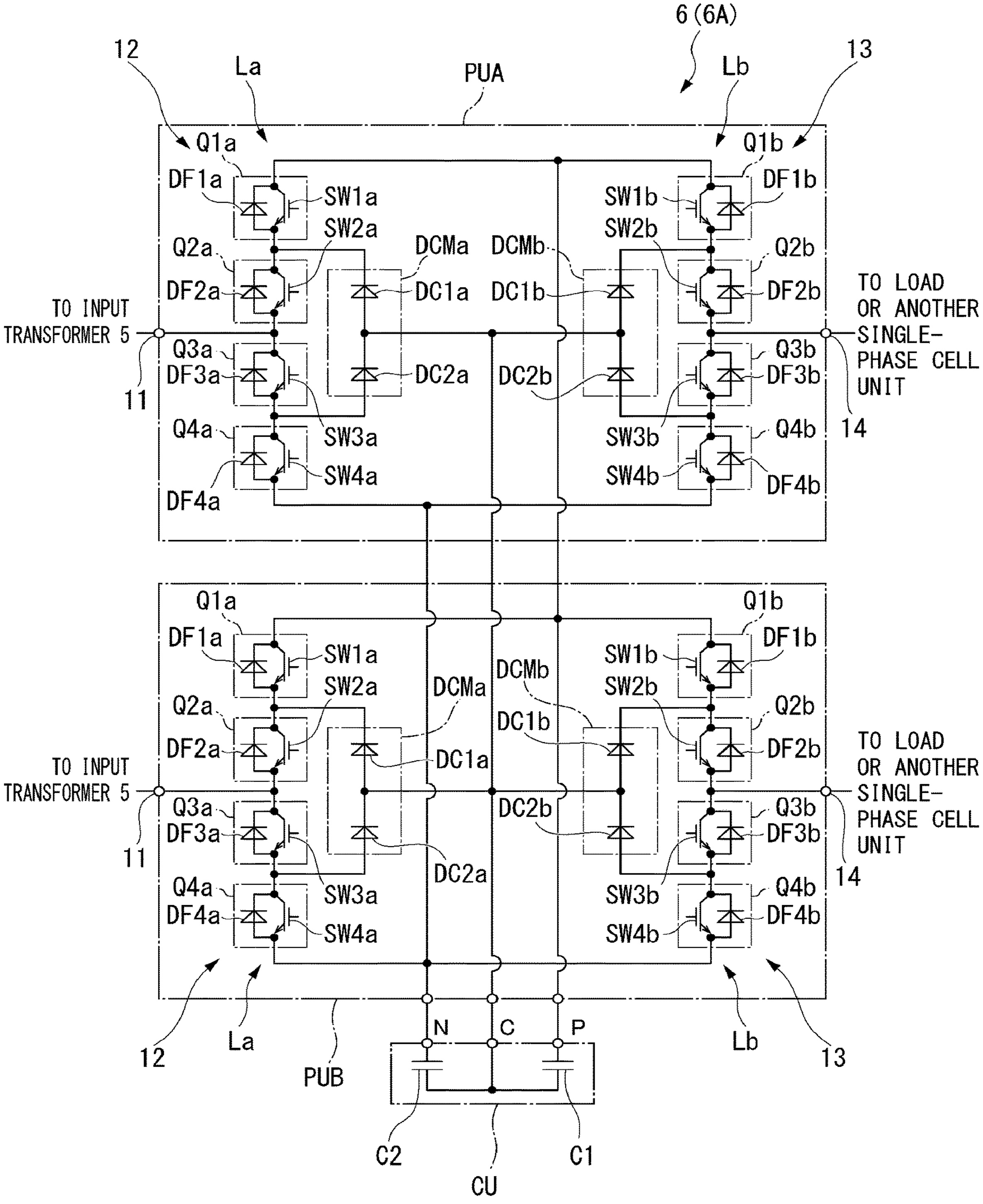
FIG. 2 is a diagram showing a single-phase cell unit of the embodiment.

FIG. 2 is a diagram showing the first single-phase cell unit 6A. The first single-phase cell unit 6A includes, for example, two power conversion units PUA and PUB and a capacitor unit CU.

1.2.2 Power Conversion Unit

The single-phase cell unit 6A constitutes a full-bridge single-phase inverter and converter including a leg capable of outputting a voltage in three levels or more by the power conversion unit PUA and the power conversion unit PUB. The power conversion unit PUA and the power conversion unit PUB are substantially the same as each other except that the AC phases are different. Therefore, in the following, the power conversion unit PUA will be described as a representative of them. The power conversion unit PUA includes, for example, a primary side terminal 11, a converter 12, an inverter 13, and a secondary side terminal 14. In the following, the primary side terminal 11 and the secondary side terminal 14 will be described first, and then the converter 12 and the inverter 13 will be described.

The primary side terminal 11 is electrically connected to the AC power supply PS via the input transformer 5.

The secondary side terminal 14 is connected to the load L or another single-phase cell unit 6, and outputs the converted power.

The converter 12 is, for example, a neutral point clamped type (NPC: Neutral Point Clamped) type three-level converter. The converter 12 includes a leg La and converts AC power into DC power. The leg La includes first to fourth switching elements SW1*a*, SW2*a*, SW3*a*, and SW4*a*, first to fourth freewheeling diodes DF1*a*, DF2*a*, DF3*a*, and DF4*a*, and first and second clamp diodes DC1*a* and DC2*a*.

Each of the first to fourth switching elements SW1*a*, SW2*a*, SW3*a*, and SW4*a* is, for example, a transistor type switching element having a self-extinguishing ability. Each of the first to fourth switching elements SW1*a*, SW2*a*, SW3*a*, and SW4*a* is, for example, a bipolar transistor type switching element. In the embodiment, each of the first to fourth switching elements SW1*a*, SW2*a*, SW3*a*, and SW4*a* is an insulated gate bipolar transistor (IGBT: Insulated Gate Bipolar Transistor). However, each of the first to fourth switching elements SW1*a*, SW2*a*, SW3*a*, and SW4*a* is not limited to the above example.

The first to fourth switching elements SW1*a*, SW2*a*, SW3*a*, and SW4*a* are electrically connected in series with each other in this order from the positive electrode P to the negative electrode N. In the embodiment, the collector of the first switching element SW1*a* is electrically connected to the positive electrode P. The collector of the second switching element SW2*a* is electrically connected to the emitter of the first switching element SW1*a*. The collector of the third switching element SW3*a* is electrically connected to the emitter of the second switching element SW2*a*. The collector of the fourth switching element SW4*a* is electrically connected to the emitter of the third switching element SW3*a*. The emitter of the fourth switching element SW4*a* is electrically connected to the negative electrode N.

In the embodiment, the primary side terminal 11 is electrically connected to a connection portion that electrically connects the emitter of the second switching element SW2*a* and the collector of the third switching element SW3*a*.

The first freewheeling diode DF1*a* is electrically connected in inverse parallel to the first switching element SW1*a*. The second freewheeling diode DF2*a* is electrically connected in inverse parallel to the second switching element SW2*a*. The third freewheeling diode DF3*a* is electrically connected in inverse parallel to the third switching element SW3*a*. The fourth freewheeling diode DF4*a* is electrically connected in inverse parallel to the fourth switching element SW4*a*. The term "connecting in inverse parallel" means that the switching element and the freewheeling diode are electrically connected in parallel, and the direction in which the current flows in the forward direction in the switching element and the direction in which the current flows in the forward direction in the freewheeling diode are opposite to each other.

The anode of the first clamp diode DC1*a* is electrically connected to the neutral point C. The cathode of the first clamp diode DC1*a* is electrically connected to a connection portion that electrically connects the emitter of the first switching element SW1*a* and the collector of the second switching element SW2*a*. The cathode of the second clamp diode DC2*a* is electrically connected to the neutral point C. The anode of the second clamp diode DC2*a* is electrically connected to a connection portion that electrically connects the emitter of the third switching element SW3*a* and the collector of the fourth switching element SW4*a*.

Here, components related to the leg La of the converter 12 in the physical configuration of the drive device 1 will be described first. The converter 12 includes, as a configuration of the leg La, a first switching module Q1*a*, a second switching module Q2*a*, a third switching module Q3*a*, a fourth switching module Q4*a*, and a clamp diode module DCMa.

The first switching module Q1*a* is a semiconductor module (module type semiconductor) that contains the first switching element SW1*a* and the first freewheeling diode DF1*a*. The second switching module Q2*a* is a semiconductor module that contains the second switching element SW2*a* and the second freewheeling diode DF2*a*. The third switching module Q3*a* is a semiconductor module that contains the third switching element SW3*a* and the third freewheeling diode DF3*a*. The fourth switching module Q4*a* is a semiconductor module that contains the fourth switching element SW4*a* and the fourth freewheeling diode DF4*a*. The clamp diode module DCMa is a semiconductor module that contains the first and second clamp diodes DC1*a* and DC2*a*.

Next, the inverter 13 will be described. The inverter 13 is, for example, an NPC type three-level inverter. The inverter 13 includes a leg Lb and converts the DC power converted by the converter 12 into AC power. The leg Lb includes first to fourth switching elements SW1*b*, SW2*b*, SW3*b*, and SW4*b*, first to fourth freewheeling diodes DF1*b*, DF2*b*, DF3*b*, and DF4*b*, and first and second clamp diodes DC1*b* and DC2*b*. The inverter 13 includes, as a physical configuration, a first switching module Q1*b*, a second switching module Q2*b*, a third switching module Q3*b*, a fourth switching module Q4*b*, and a clamp diode module DCMb, for example. Here, the configuration and function of the leg Lb of the inverter 13 is substantially the same as the configuration and function of the leg La of the converter 12. Therefore, the descriptions for the leg Lb is obtained by replacing the subscript "a" of each reference numeral with the subscript "b" in the above descriptions for the leg La.

1.2.3 Capacitor Unit

The capacitor unit CU includes a plurality of first capacitors C1 (only one is shown in FIG. 2) and a plurality of second capacitors C2 (only one is shown in FIG. 2). The first capacitor C1 is disposed between the converter 12 and the inverter 13 and is electrically connected between the positive electrode P and the neutral point C. The second capacitor C2 is disposed between the converter 12 and the inverter 13 and is electrically connected between the negative electrode N and the neutral point C. The capacitors C1 and C2 smooth a voltage of the DC power converted from the AC power by the converter 12, for example.

2. Physical Configuration

Figure 3:
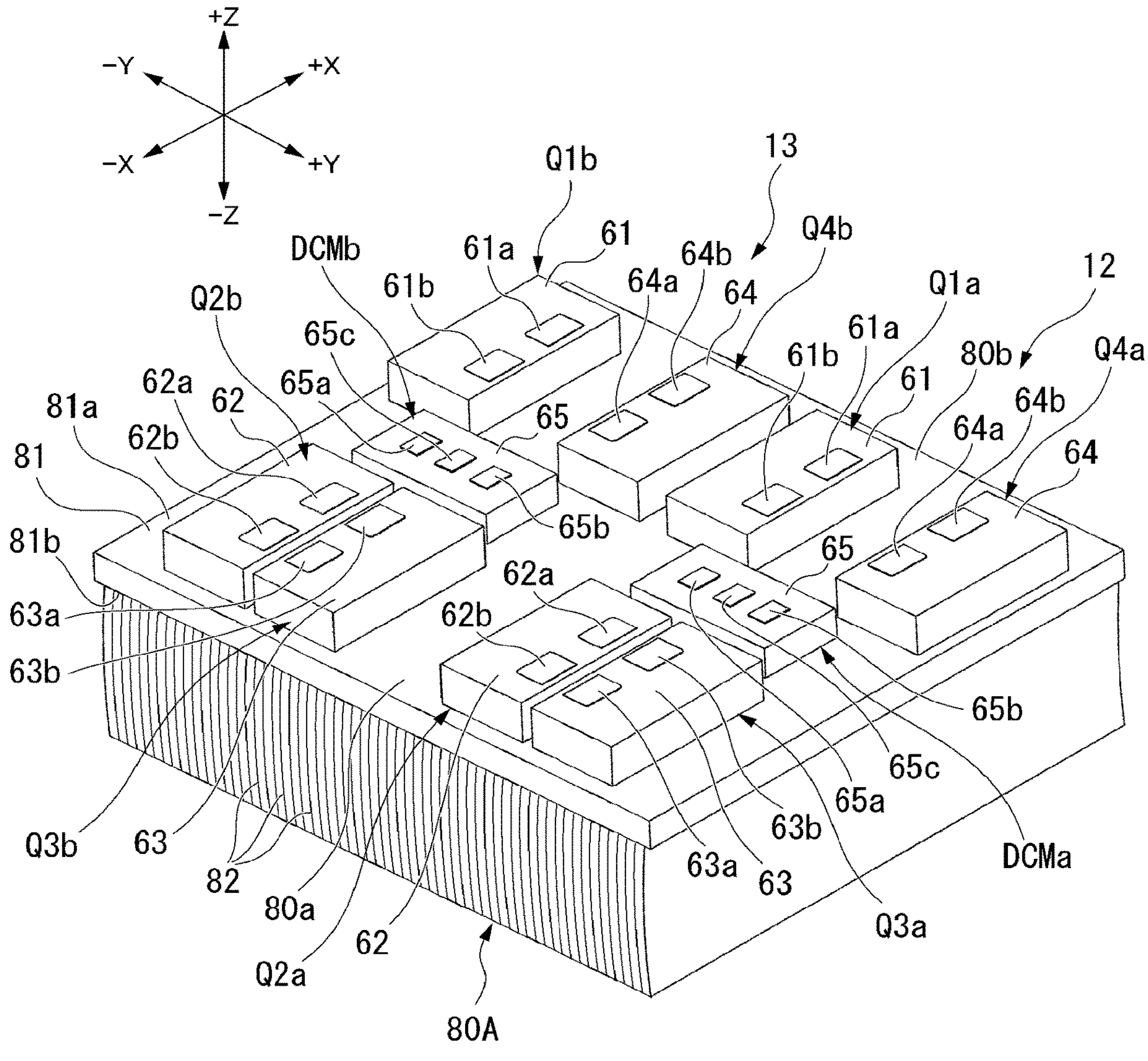
FIG. 3 is a perspective view showing a part of configuration of the power conversion unit of the embodiment

Next, a physical configuration of the drive device 1 will be described. FIG. 3 is a perspective view showing a part of configuration of the power conversion unit PUA. The power conversion unit PUB has a substantially symmetrical structure or a substantially the same structure as the power conversion unit PUA, and thus the description for the power conversion unit PUB will be omitted. Here, a +X direction, a −X direction, a +Y direction, a −Y direction, a +Z direction, and a −Z direction are defined. The +X direction, the −X direction, the +Y direction, and the −Y direction are directions along a first surface 81*a* of the heat sink 80A described later. The +X direction is a direction from a first end 80*a* of the heat sink 80A toward a second end 80*b* of the heat sink 80A. The −X direction is opposite to the +X direction. In a case where the +X direction and the −X direction are not distinguished, each of them is simply referred to as "X direction". The +Y direction and the −Y direction are directions different from the X direction (for example, substantially orthogonal to the X direction). The +Y direction is a direction in which the converter 12 is located with respect to the inverter 13. The −Y direction is opposite to the +Y direction. In a case where the +Y direction and the −Y direction are not distinguished, each of them is simply referred to as "Y direction". The +Z direction and the −Z direction are different from the X direction and the Y direction (for example, substantially orthogonal to the X direction and the Y direction). The +Z direction is a direction from the heat sink 80A toward the converter 12 and the inverter 13. The −Z direction is opposite to the +Z direction. In a case where the +Z direction and the −Z direction are not distinguished, each of them is simply referred to as "Z direction". In the embodiment, the Y direction is an example of a "first direction". The Z direction is an example of a "second direction". The X direction is an example of a "third direction".

As shown in FIG. 3, the power conversion unit PUA includes, for example, the converter 12 and the inverter 13, a plurality of bus 71, 72, 73, 74, 75, 76, 77, 78, 79, and 80 (See FIGS. 4 and 5), and the heat sink 80A. Here, for convenience of explanation, the heat sink 80A will be described first.

The heat sink 80A includes a base 81 and a plurality of fins 82. The base 81 is formed in a plate shape along the X and Y directions. The base 81 has the first surface 81*a* facing in the +Z direction and a second surface 81*b* located on the opposite side of the first surface 81*a*. The first switching modules Q1*a* and Q1*b*, the second switching modules Q2*a* and Q2*b*, the third switching modules Q3*a* and Q3*b*, the fourth switching modules Q4*a* and Q4*b*, and the clamp diode modules DCMa, and DCMb are attached to the first surface 81*a*. At least a part of (for example, most of) heat generated by these module sets is transferred to the heat sink 80A. The plurality of fins 82 project from the base 81 in the −Z direction.

Next, each configuration of the converter 12 will be described in detail. The description of the gate terminal of each module will be omitted. The first switching module Q1*a* includes a package (outer member) 61 containing the first switching element SW1*a* and the first freewheeling diode DF1*a*. On a surface of the package 61, a first terminal 61*a* and a second terminal 61*b* exposed to the outside of the package 61 are provided. The collector of the first switching element SW1*a* and the cathode of the first freewheeling diode DF1*a* are electrically connected to the first terminal 61*a* inside the package 61. The emitter of the first switching element SW1*a* and the anode of the first freewheeling diode DF1*a* are electrically connected to the second terminal 61*b* inside the package 61. The two terminals 61*a* and 61*b* are arranged in the +X direction in the order of the terminal 61*b* and the terminal 61*a*.

The second switching module Q2*a* includes a package 62 containing the second switching element SW2*a* and the second freewheeling diode DF2*a*. On a surface of the package 62, a first terminal 62*a* and a second terminal 62*b* exposed to the outside of the package 62 are provided. The collector of the second switching element SW2*a* and the cathode of the second freewheeling diode DF2*a* are electrically connected to the first terminal 62*a* inside the package 62. The emitter of the second switching element SW2*a* and the anode of the second freewheeling diode DF2*a* are electrically connected to the second terminal 62*b* inside the package 62. The two terminals 62*a* and 62*b* are arranged in the +X direction in the order of the terminal 62*b* and the terminal 62*a*. The second switching module Q2*a* is located on the −X direction side with respect to the first switching module Q1*a*.

The third switching module Q3*a* includes a package 63 containing the third switching element SW3*a* and the third freewheeling diode DF3*a*. On a surface of the package 63, a first terminal 63*a* and a second terminal 63*b* exposed to the outside of the package 63 are provided. The collector of the third switching element SW3*a* and the cathode of the third freewheeling diode DF3*a* are electrically connected to the first terminal 63*a* inside the package 63. The emitter of the third switching element SW3*a* and the anode of the third freewheeling diode DF3*a* are electrically connected to the second terminal 63*b* inside the package 63. The two terminals 63*a* and 63*b* are arranged in the +X direction in the order of the terminal 63*a* and the terminal 63*b*. In the embodiment, the third switching module Q3*a* is located on the +Y direction side with respect to the second switching module Q2*a*. The package 62 of the second switching module Q2*a* and the package 63 of the third switching module Q3*a* are arranged side by side in the Y direction. The third switching module Q3*a* is located on the −X direction side with respect to the fourth switching module Q4*a*.

The fourth switching module Q4*a* includes a package 64 containing the fourth switching element SW4*a* and the fourth freewheeling diode DF4*a*. On a surface of the package 64, a first terminal 64*a* and a second terminal 64*b* exposed to the outside of the package 64 are provided. The collector of the fourth switching element SW4*a* and the cathode of the fourth freewheeling diode DF4*a* are electrically connected to the first terminal 64*a* inside the package 64. The emitter of the fourth switching element SW4*a* and the anode of the fourth freewheeling diode DF4*a* are electrically connected to the second terminal 64*b* inside the package 64. The two terminals 64*a* and 64*b* are arranged in the +X direction in the order of the terminal 64*a* and the terminal 64*b*.

The clamp diode module DCMa includes a package 65 containing the first and second clamp diodes DC1*a* and DC2*a*. On a surface of the package 65, a first terminal 65*a*, a second terminal 65*b*, and a third terminal 65*c* exposed to the outside of the package 65 are provided. The cathode of the first clamp diode DC1*a* is electrically connected to the first terminal 65*a* inside the package 65. The anode of the second clamp diode DC2*a* is electrically connected to the second terminal 65*b* inside the package 65. The anode of the first clamp diode DC1*a* and the cathode of the second clamp diode DC2*a* are electrically connected to the third terminal 65*c* inside the package 65. The three terminals 65*a*, 65*b*, and 65*c* are arranged in the +Y direction in the order of the terminal 65*a*, the terminal 65*c*, and the terminal 65*b*.

The clamp diode module DCMa is arranged between a pair of the second switching module Q2*a* and the third switching module Q3*a* in the X direction and is arranged between a pair of the first switching module Q1*a* and the fourth switching module Q4*a* in the X direction.

Next, the inverter 13 will be described. The inverter 13 is arranged in substantially the same arrangement layout as the converter 12. The description for the inverter 13 is obtained by replacing the subscript "a" of each numeral with the subscript "b" in the description for the converter 12.

Figure 4:
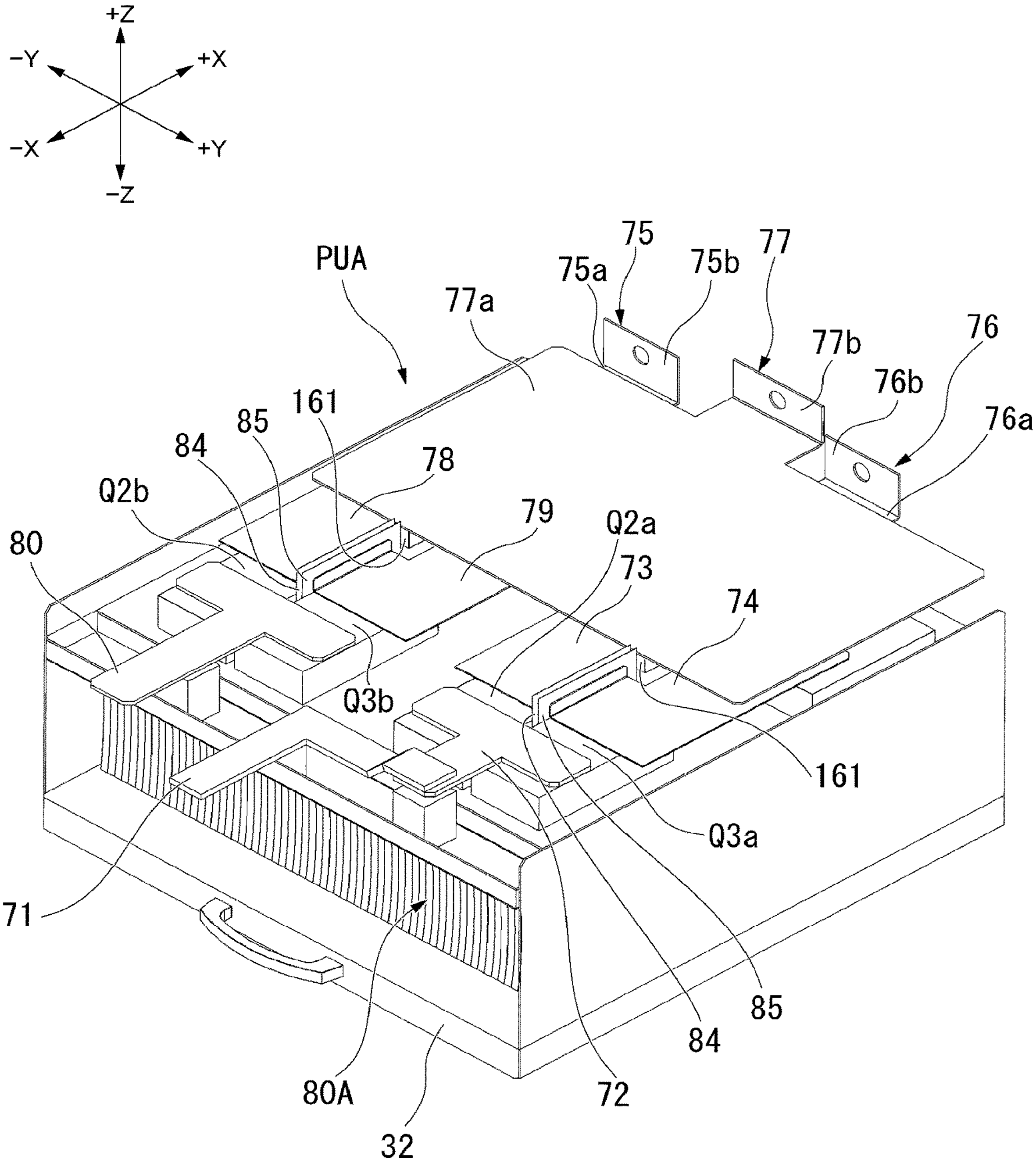
FIG. 4 is a perspective view showing the power conversion unit of the embodiment.
Figure 5:
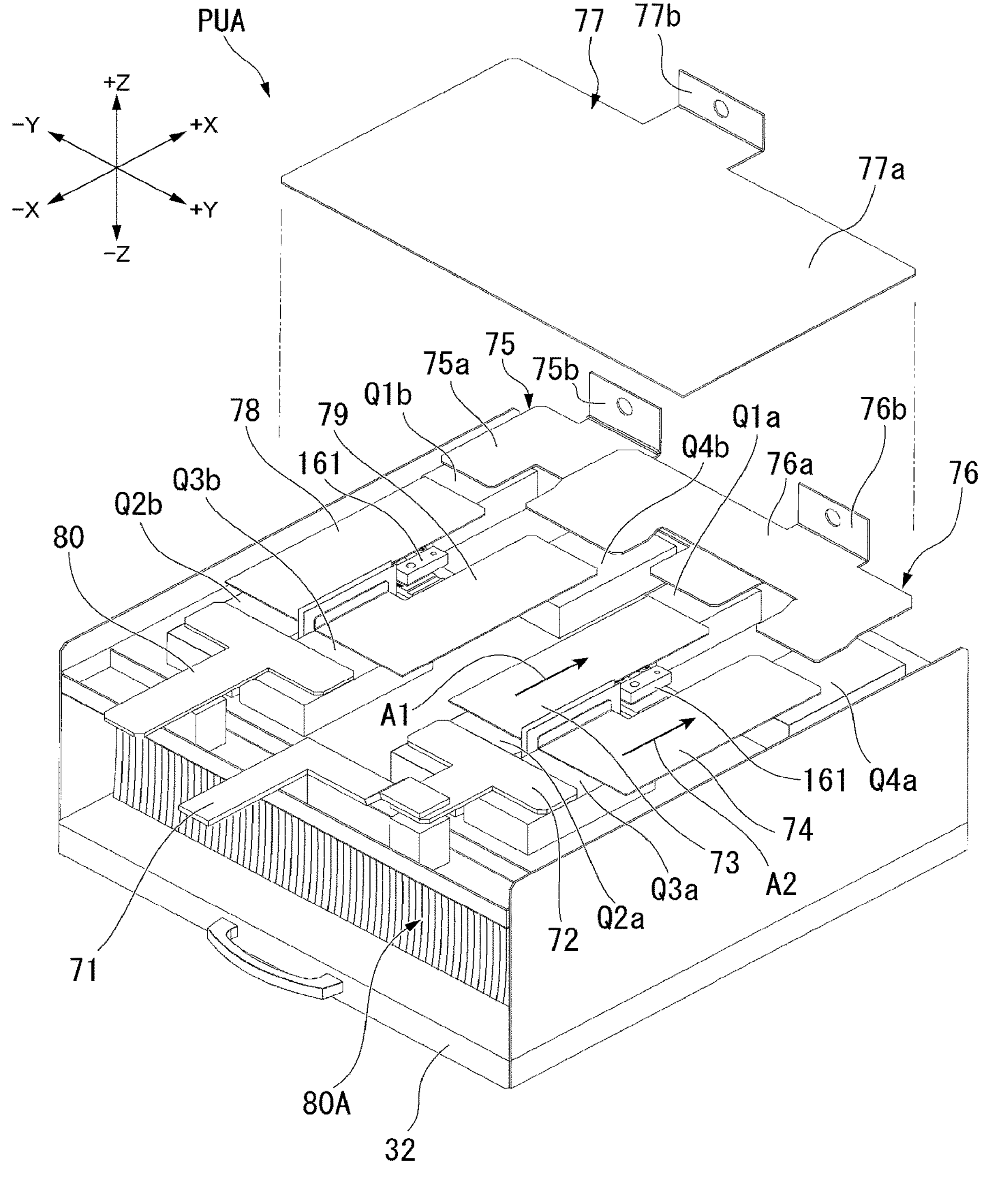
FIG. 5 is a perspective view showing a state in which a neutral point bus is detached from the power conversion unit shown in FIG. 4.

Next, the buses 71, 72, 73, 74, 75, 76, 77, 78, 79, and 80 included in the power conversion unit PUA will be described. FIG. 4 is a perspective view showing the power conversion unit PUA. FIG. 5 is a perspective view showing a state in which the neutral point bus 77 is detached from the power conversion unit PUA shown in FIG. 4. As shown in FIGS. 4 and 5, a support chassis 32 is attached to the configuration shown in FIG. 3. The arrows A1 and A2 in FIG. 5 will be described later.

The power conversion unit PUA includes a relay bus 71, a first terminal bus 72, a first connection bus 73, a second connection bus 74, a positive electrode bus 75, a negative electrode bus 76, the neutral point bus 77, a third connection bus 78, and a fourth connection bus 79, and a second terminal bus 80.

The relay bus 71 is electrically connected to the input transformer 5.

The first terminal bus 72 is connected to the relay bus 71. The first terminal bus 72 is connected to the second terminal 62*b* of the second switching module Q2*a* and the first terminal 63*a* of the third switching module Q3*a*.

The first connection bus 73 is connected to the second terminal 61*b* of the first switching module Q1*a*, the first terminal 62*a* of the second switching module Q2*a*, and the first terminal 65*a* of the clamp diode module DCMa, and electrically connects these terminals 61*b*, 62*a*, and 65*a*. The details of the first connecting bus 73*a* and a first insulating member 84 attached to the first connecting bus 73 will be described later.

The second connection bus 74 is connected to the second terminal 63*b* of the third switching module Q3*a*, the first terminal 64*a* of the fourth switching module Q4*a*, and the second terminal 65*b* of the clamp diode module DCMa, and electrically connects these terminals 63*b*, 64*a*, and 65*b*. The details of the second connecting bus 74 and a second insulating member 85 attached to the second connecting bus 74 will be described later.

The positive electrode bus 75 includes a positive electrode main portion 75*a* and a positive electrode connecting portion 75*b*. The positive electrode main portion 75*a* is formed in a plate shape along the X and Y directions (see FIG. 5). The positive electrode main portion 75*a* is connected to the first terminal 61*a* of the first switching module Q1*a* of the converter 12 and the first terminal 61*a* of the first switching module Q1*b* of the inverter 13, and electrically connects these terminals 61*a* and 61*a*. The positive electrode connecting portion 75*b* is electrically connected to the positive electrode P to which the first capacitor C1 (see FIG. 2) is electrically connected.

The negative electrode bus 76 includes a negative electrode main portion 76*a* and a negative electrode connecting portion 76*b*. The negative electrode main portion 76*a* is formed in a plate shape along the X and Y directions (see FIG. 5). The negative electrode main portion 76*a* is connected to the second terminal 64*b* of the fourth switching module Q4*a* of the converter 12 and the second terminal 64*b* of the fourth switching module Q4*b* of the inverter 13, and electrically connects these terminals 64*b* and 64*b*. The negative electrode connecting portion 76*b* is electrically connected to the negative electrode N to which the second capacitor C2 (see FIG. 2) is electrically connected.

The neutral point bus 77 includes a neutral point main portion 77*a* and a neutral point connecting portion 77*b*. The neutral point main portion 77*a* is formed in a plate shape along the X and Y directions. The neutral point main portion 77*a* is arranged on the +Z direction side with respect to the positive electrode main portion 75*a*, the negative electrode main portion 76*a*, and the connecting buses 73, 74, 78, and 79, and overlaps the positive electrode main portion 75*a*, the negative electrode main portion 76*a*, and the connecting buses 73, 74, 78, and 79, with a gap to secure an insulation distance between the neutral point main portion 77*a* and the positive electrode main portion 75*a*, the negative electrode main portion 76*a*, and the connecting buses 73, 74, 78, and 79 in the Z direction. However, the insulation between the neutral point main body 77*a* and the positive electrode main portion 75*a*, the negative electrode main portion 76*a*, and the connecting buses 73, 74, 78, and 79 is not limited to spatial insulation, and may be barrier insulation. The neutral point main portion 77*a* is electrically connected to the third terminal 65*c* of the clamp diode module DCMa of the converter 12 and the third terminal 65*c* of the clamp diode module DCMb of the inverter 13, and electrically connects these terminals 65*c* and 65*c*. The neutral point main portion 77*a* is electrically connected to the terminals 65*c* and 65*c* via, for example, a conductive spacer 161. The connection structure between the neutral point main portion 77*a* and the terminals 65*c* and 65*c* is not limited to the structure using the conductive spacer 161. A bent portion corresponding to the conductive spacer 161 may be provided in the neutral point main portion 77*a* by press working. The neutral point connecting portion 77*b* is electrically connected to the neutral point C to which the first and second capacitors C1 and C2 (see FIG. 2) are electrically connected.

The third connection bus 78 is connected to the second terminal 61*b* of the first switching module Q1*b*, the first terminal 62*a* of the second switching module Q2*b*, and the first terminal 65*a* of the clamp diode module DCMb, and electrically connects these terminals 61*b*, 62*a*, and 65*a*. The third connecting bus 78 has substantially the same shape and function as the first connecting bus 73. Therefore, the duplicate description will be omitted.

The fourth connection bus 79 is connected to the second terminal 63*b* of the third switching module Q3*b*, the first terminal 64*a* of the fourth switching module Q4*b*, and the second terminal 65*b* of the clamp diode module DCMb, and electrically connects these terminals 63*b*, 64*a*, and 65*b*. The fourth connecting bus 79 has substantially the same shape and function as the second connecting bus 74. Therefore, the duplicate description will be omitted.

The second terminal bus 80 is connected to the second terminal 62*b* of the second switching module Q2*b* and the first terminal 63*a* of the third switching module Q3*b*. The second terminal bus 80 is electrically connected to the load L.

Figure 6:
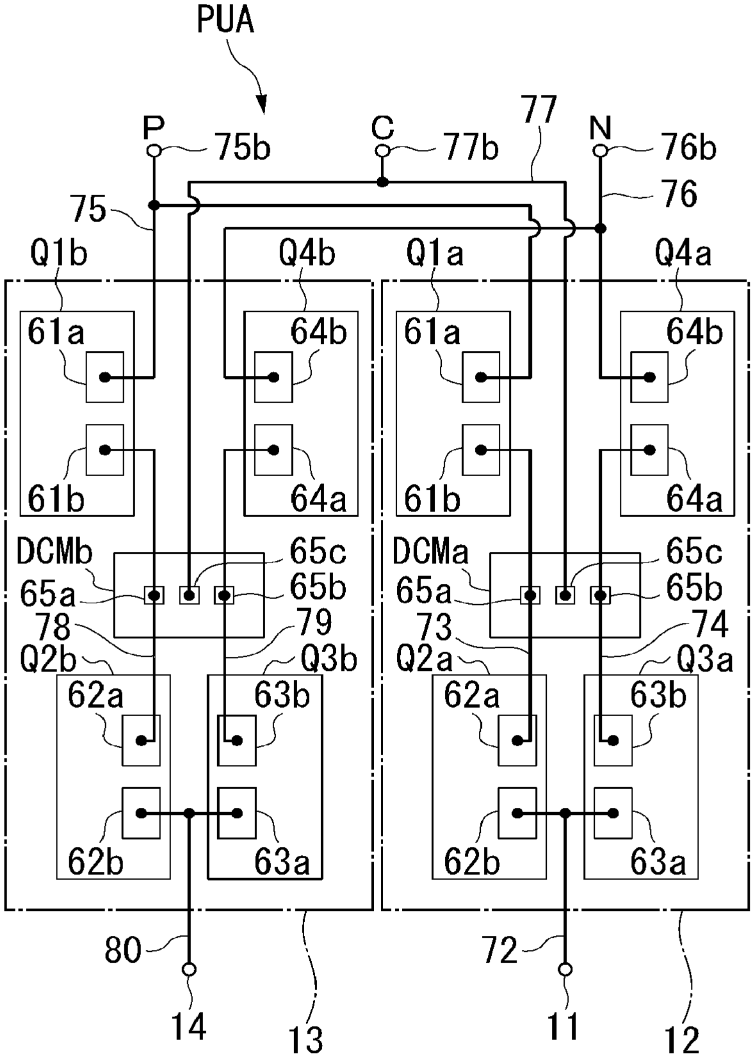
FIG. 6 is a diagram showing an electrical connection relation of components in the power conversion unit of the embodiment.

FIG. 6 is a diagram showing an electrical connection relationship of components included in the power conversion unit PUA. Note that the electrical connection relationship shown in FIG. 6 is as described above in the descriptions for Bus 71, 72, 73, 74, 75, 76, 77, 78, 79, and 80, and thus the duplicate descriptions are omitted. In the following description, for convenience of explanation, the switching modules Q1*a*, Q2*a*, Q3*a*, and Q4*a* and the clamp diode module DCMa may be referred to as switching modules Q1, Q2, Q3, and Q4 and the clamp diode module DCM, respectively. Further, the clamp diodes DC1*a* and DC2*a* may be referred to as clamp diodes DC1 and DC2, respectively.

Figure 7:
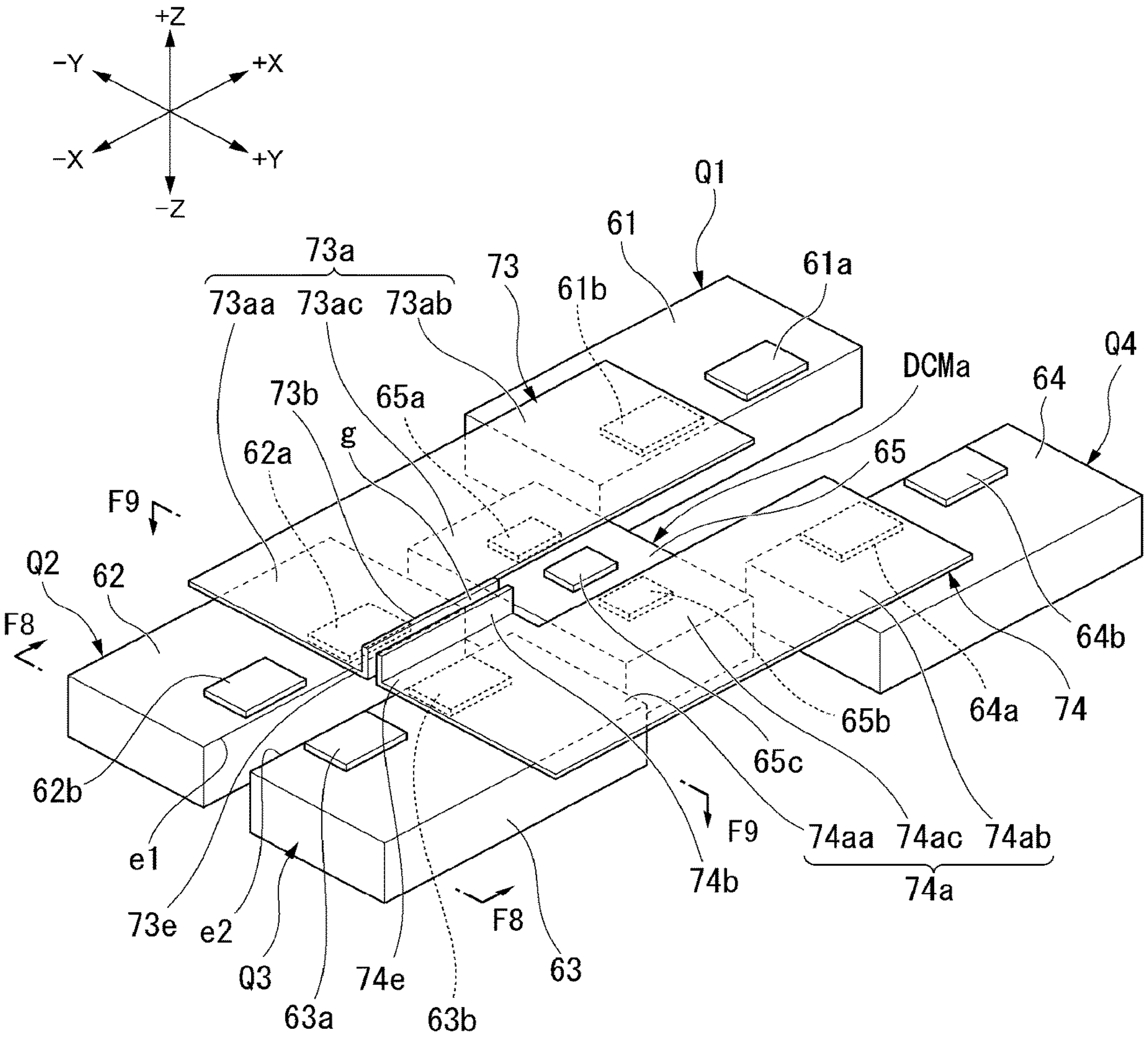
FIG. 7 is a perspective view showing connection buses and modules of the embodiment.

Next, The details of the first connection bus 73 and the second connection bus 74 of the embodiment will be described. FIG. 7 is a perspective view showing the connection buses 73 and 74 and the modules Q1, Q2, Q3, Q4, and DCM. Note that FIG. 7 omits the illustration of the insulating members 84 and 85 attached to the connecting buses 73 and 74.

First, the first connection bus 73 will be described. The first connection bus 73 is an example of a "first bus". The first connecting bus 73 includes a first main portion 73*a* and a first standing portion 73*b*, for example.

The first main portion 73*a* is formed in a plate shape along the X and Y directions. The first main portion 73*a* extends, in the X direction, from the second switching module Q2 to the first switching module Q1 through a region overlapping the clamp diode module DCM. More specifically, the first main portion 73*a* includes a first portion 73*aa*, a second portion 73*ab*, and a third portion 73*ac*. The first portion 73*aa* is located at one end of the first main portion 73*a* in the X direction and overlaps the package 62 of the second switching module Q2 in the Z direction. The second portion 73*ab* is located at the other end of the first main portion 73*a* in the X direction and overlaps the package 61 of the first switching module Q1 in the Z direction. The third portion 73*ac* is located between the first portion 73*aa* and the second portion 73*ab* in the X direction and overlaps the package 65 of the clamp diode module DCM in the Z direction.

The first main unit 73*a* is connected to the second terminal 61*b* of the first switching module Q1, the first terminal 62*a* of the second switching module Q2, and the first terminal 65*a* of the clamp diode module DCM, and electrically connects these terminals 61*b*, 62*a*, and 65*a*. In the embodiment, the first main portion 73*a* has a relatively large width in the Y direction. As a result, for example, a continuous maximum permissible current capacity of the first connection bus 73 is increased, and the inductance is reduced.

Here, the package 62 of the second switching module Q2 includes an edge e1 facing the third switching module Q3. The edge e1 is an example of a "first edge portion". The edge e1 is a portion of the second switching module Q2 located on the most +Y direction side. The first portion 73*aa* of the first main portion 73*a* includes an extension portion (overhanging portion) 73*e* extending closer to the third switching module Q3 than the edge e1 of the second switching module Q2. The expression "the first portion 73*aa* includes an extension portion 73*e* extending closer to the third switching module Q3 than the edge e1 of the second switching module Q2" means that a part of the first portion 73*aa* protrudes beyond the edge e1 of the second switching module Q2 in the +Y direction.

The first standing portion 73*b* is provided in an end of the first main portion 73*a* on the +Y direction side, and stands up with respect to the first main portion 73*a*. The term "standing up" in the specification is not limited to a case of standing up upward, but broadly means cases of standing up (for example, being bent or swelled) in a direction different from the direction in which the first main portion 73*a* (or the second main portion 74*a*) spreads. Further, the term "standing up" is not limited to a case of standing up substantially vertically, but also includes cases of standing up at an angle smaller or larger than the substantially vertical direction. In the embodiment, the first standing portion 73*b* is a bent portion (first bent portion) formed by bending a part of a plate member forming the first connecting bus 73 at the end of the first main portion 73*a*. The first standing portion 73*b* stands up in the +Z direction with respect to the first main portion 73*a*, for example. The first standing portion 73*b* stands up substantially vertically with respect to the first main portion 73*a*, for example.

In the embodiment, the first standing portion 73*b* is not provided in the second portion 73*ab* and the third portion 73*ac* of the first main portion 73*a*, but is provided only in the first portion 73*aa*. In the embodiment, the first standing portion 73*b* is provided in an end of the extension portion 73*e* of the first portion 73*aa* on the +Y direction side, and stands up with respect to the first main portion 73*a* at a position closer to the third switching module Q3 than the edge e1 of the second switching module Q2 (that is, the first standing portion 73*b* stands up at a position overhanging from the edge e1 of the second switching module Q3).

The first standing portion 73*b* extends in the X direction along an end of the first main portion 73*a* on the +Y direction side. For example, the first standing portion 73*b* extends in the X direction while keeping the same standing amount (bending amount) in the Z direction.

Next, the second connection bus 74 will be described. The second connection bus 74 is an example of a "second bus". The second connecting bus 74 includes, for example, a second main portion 74*a* and a second standing portion 74*b*.

The second main portion 74*a* is formed in a plate shape along the X and Y directions. The second main portion 74*a* extends, in the X direction, from the third switching module Q3 to the fourth switching module Q4 through a region overlapping the clamp diode module DCM. More specifically, the second main portion 74*a* includes a first portion 74*aa*, a second portion 74*ab*, and a third portion 74*ac*. The first portion 74*aa* is located at one end of the second main portion 74*a* in the X direction and overlaps the package 63 of the third switching module Q3 in the Z direction. The second portion 74*ab* is located at the other end of the second main portion 74*a* in the X direction and overlaps the package 64 of the fourth switching module Q4 in the Z direction. The third portion 74*ac* is located between the first portion 74*aa* and the second portion 74*ab* in the X direction and overlaps the package 65 of the clamp diode module DCM in the Z direction.

The second main portion 74*a* is connected to the second terminal 63*b* of the third switching module Q3, the first terminal 64*a* of the fourth switching module Q4, and the second terminal 65*b* of the clamp diode module DCM, and electrically connects these terminals 63*b*, 64*a*, and 65*b*. In the embodiment, the second main portion 74*a* has a relatively large width in the Y direction. As a result, for example, a continuous maximum permissible current capacity of the second connection bus 74 is increased, and the inductance is reduced.

Here, the package 63 of the third switching module Q3 includes an edge e2 facing the second switching module Q2. The edge e2 is an example of a "second edge". The edge e2 is a portion of the third switching module Q3 located on the most −Y direction side. The first portion 74*aa* of the second main portion 74*a* includes an extension portion (overhanging portion) 74*e* extending closer to the second switching module Q2 than the edge e2 of the third switching module Q3. The expression "the first portion 74*aa* includes an extension portion 74*e* extending closer to the second switching module Q2 than the edge e2 of the third switching module Q3" means that a part of the first portion 74*aa* protrudes beyond the edge e2 of the third switching module Q3 in the −Y direction.

The second standing portion 74*b* is provided in an end of the second main portion 74*a* on the −Y direction side, and stands up with respect to the second main portion 74*a*. In the embodiment, the second standing portion 74*b* is a bent portion (second bent portion) formed by bending a part of a plate member forming the second connecting bus 74 at the end of the second main portion 74*a*. The second standing portion 74*b* stands up in the +Z direction with respect to the second main portion 74*a*. The second standing portion 74*b* stands up substantially vertically with respect to the second main portion 74*a*, for example.

In the embodiment, the second standing portion 74*b* is not provided in the second portion 74*ab* and the third portion 74*ac* of the second main portion 74*a*, but is provided in an end of the first portion 74*aa*. For example, the second standing portion 74*b* is provided in an end of the extension portion 74*e* of the first portion 74*aa* in the −Y direction, and stands up at a position closer to the second switching module Q2 than the edge e2 of the third switching module Q3 (that is, the second standing portion 74*b* stands up at a position overhanging from the edge e2 of the third switching module Q3).

The second standing portion 74*b* extends in the X direction along an end of the second main portion 74*a* on the −Y direction side. For example, the second standing portion 74*b* extends in the X direction while keeping the same standing amount (bending amount) in the Z direction.

In the embodiment, the first standing portion 73*b* of the first connecting bus 73 and the second standing portion 74*b* of the second connecting bus 74 have substantially the same shape and face each other in the Y direction. A gap g is formed between the first standing portion 73*b* and the second standing portion 74*b*. The first standing portion 73*b* and the second standing portion 74*b* are arranged substantially parallel to each other over a certain distance in the X direction.

Figure 8:
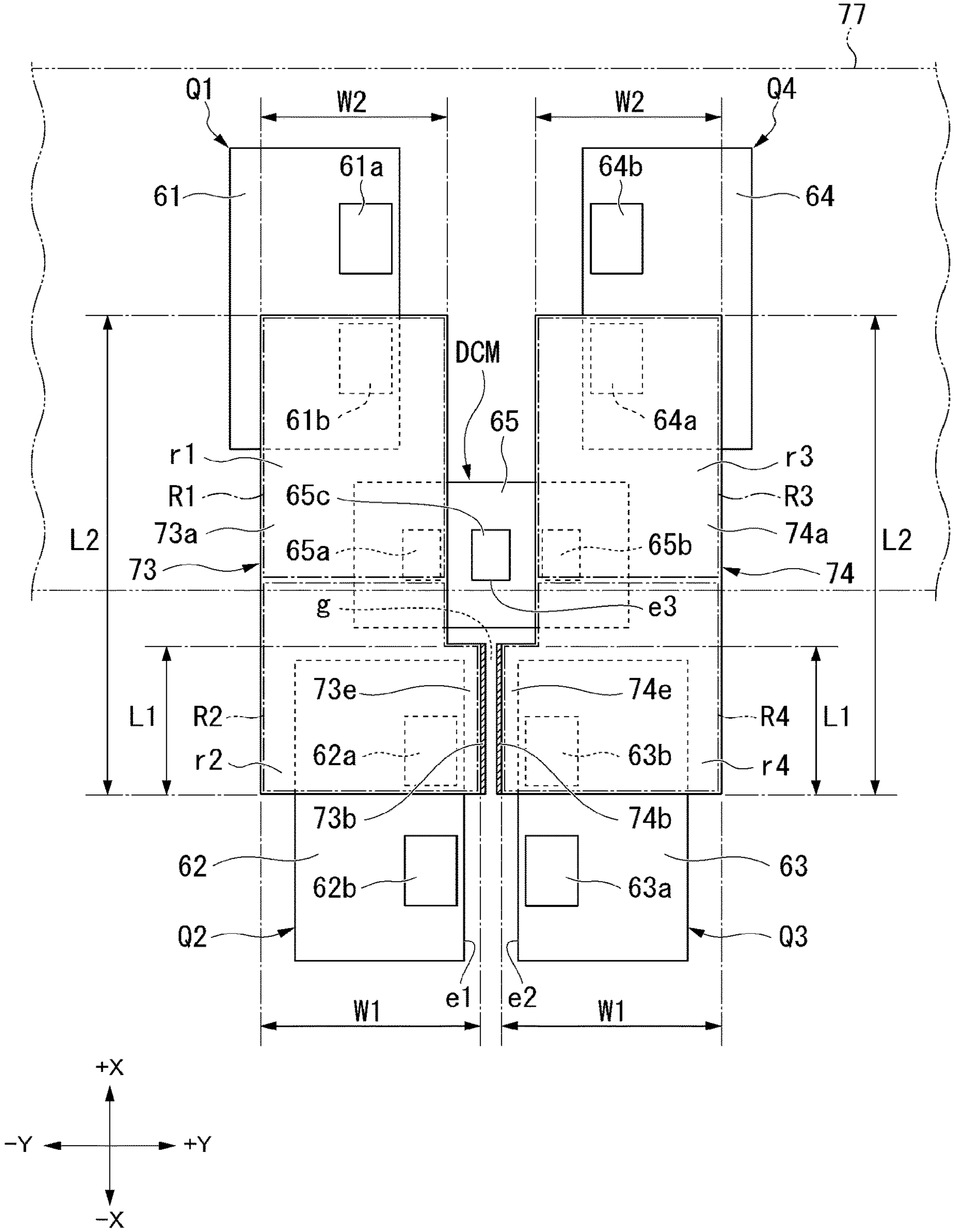
FIG. 8 is a cross-sectional view taken along line F8-F8 of showing the components shown in FIG. 7.

FIG. 8 is a cross-sectional view taken along line F8-F8 showing the components shown in FIG. 8. Note that in FIG. 8, illustration of the insulating members 84 and 85 attached to the connecting buses 73 and 74 are omitted.

As shown in FIG. 8, the third terminal 65*c* of the clamp diode module DCM includes an edge e3 closest to the second switching module Q2 and the third switching module Q3 among edges of the third terminal 65*c*. The edge e3 is an example of a "third edge".

The first main portion 73*a* of the first connection bus 73 includes a first region R1 and a second region R2, the first region R1 being located farther than the edge e3 of the third terminal 65*c* of the clamp diode module DCM in the X direction when viewed from the first terminal 62*a* (or the second terminal 62*b*) of the second switching module Q2, the second region R2 being located closer than the edge e3 of the third terminal 65*c* of the clamp diode module DCM in the X direction when viewed from the first terminal 62*a* (or the second terminal 62*b*) of the second switching module Q2. The first standing portion 73*b* is not provided in the first region R1, but is provided in at least a part of the second region R2.

Similarly, the second main portion 74*a* of the second connection bus 74 includes a first region R3 and a second region R4, the first region R3 being located farther than the edge e3 of the third terminal 65*c* of the clamp diode module DCM in the X direction when viewed from the second terminal 63*b* (or the first terminal 63*a*) of the third switching module Q3, the second region R4 being closer than the edge e3 of the third terminal 65*c* of the clamp diode module DCM in the X direction when viewed from the second terminal 63*b* (or the first terminal 63*a*) of the third switching module Q3. The second standing portion 74*b* is not provided in the first region R3, but is provided in at least a part of the second region R4. As a result, an insulation between the first and second standing portions 73*b* and 74*b* and the third terminal 65*c* of the clamp diode module DCM is able to be reliably ensured without providing a specific insulating structure.

In another point of view, the first main portion 73*a* of the first connecting bus 73 includes a region r1 that is covered with the neutral point bus 77 in the Z direction and a region r2 that is not covered with the neutral point bus 77 in the Z direction. The first standing portion 73*b* is not provided in the region r1 that is covered with the neutral point bus 77 in the first main portion 73*a*, but is provided in at least a part of the region r2 that is not covered with the neutral point bus 77 in the first main portion 73*a*. Similarly, the first main portion 74*a* of the second connecting bus 74 includes a region r3 that is covered with the neutral point bus 77 in the Z direction and a region r4 that is not covered with the neutral point bus 77 in the Z direction. The second standing portion 74*b* is not provided in the region r3 that is covered with the neutral point bus 77 in the second main portion 74*a*, but is provided in at least a part of region r4 that is not covered with the neutral point bus 77 in the second main portion 74*a*. As a result, it is possible to avoid interference between the first and second standing portions 73*b* and 74*b* and the neutral point bus 77, and it is possible to reduce the size of the device.

In FIG. 8, the dimension W1 is the width of the first portion 73*aa* of the first main portion 73*a* in the Y direction. The dimension W2 is the width of the second portion 73*ab* of the first main portion 73*a* in the Y direction, and is the width of the third portion 73*ac* of the first main portion 73*a* in the Y direction. The dimension L1 is the length of the first standing portion 73*b* in the X direction. The dimension L2 is the length (the entire length) of the first connecting bus 73 in the X direction. An example of the dimensions W1, W2, L1, and L2 will be described later. The shape of the second connecting bus 74 is substantially the same as the shape of the first connecting bus 73, except that they are line-symmetrical with each other. Therefore, each dimension of the second connecting bus 74 is represented by using the same reference numeral as each dimension of the first connecting bus 73.

Figure 9:
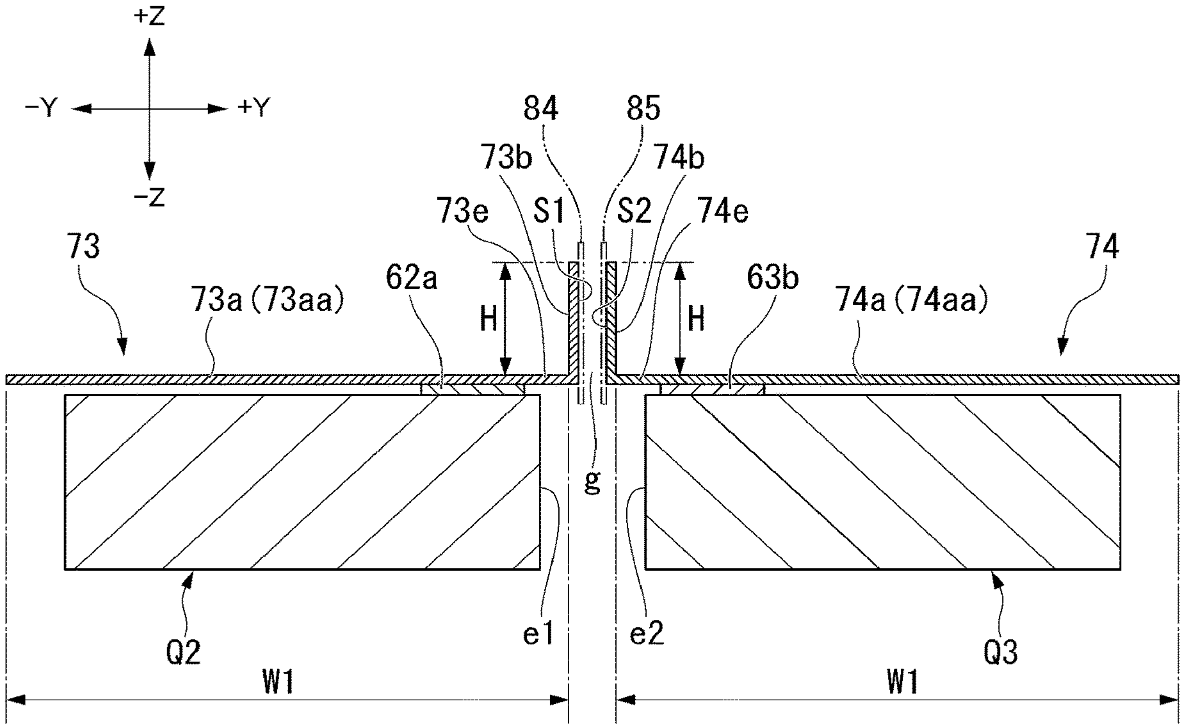
FIG. 9 is a cross-sectional view taken along line F9-F9 of showing the components shown in FIG. 8.
Figure 10:
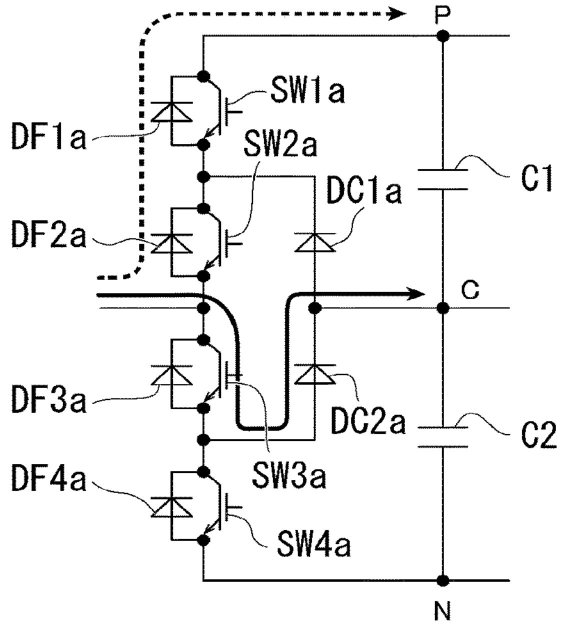
FIG. 10 is a diagram showing a current flow in a turn-off process of a third switching element of the embodiment.

FIG. 9 is a cross-sectional view taken along line F9-F9 of showing the components shown in FIG. 7. The standing amount H of the first standing portion 73*b* will be described. In the embodiment, the standing amount H of the first standing portion 73*b* in the Z direction is smaller than the width (for example, the width W1 of the first portion 73*ac*) of the first main portion 73*a* in the Y direction. In another point of view, the standing amount H of the first standing portion 73*b* in the Z direction is smaller than the minimum width (for example, the width W2 of the second portion 73*ab* or the third portion 73*ac*) of the first main portion 73*a* in the Y direction. The standing amount H of the first standing portion 73*b* is set to, for example, 10 mm or less. In the embodiment, the standing amount H of the first standing portion 73*b* is 10 mm.

Similarly, the standing amount H of the second standing portion 74*b* in the Z direction is smaller than the width (for example, the width W1 of the first portion 74*aa*) of the second main portion 74*a* in the Y direction. In another point of view, the standing amount H of the second standing portion 74*b* in the Z direction is smaller than the minimum width (for example, the width W2 of the second portion 74*ab* or the third portion 74*ac*) of the first main portion 74*a* in the Y direction. The standing amount H of the first standing portion 74*b* is set to, for example, 10 mm or less. In the embodiment, the standing amount H of the first standing portion 74*b* is 10 mm.

Next, the insulating members 84 and 85 disposed between the first connecting bus 73 and the second connecting bus 74 will be described. In the embodiment, the converter 12 includes the first and second insulating members 84 and 85. At least a part of each of the first and second insulating members 84 and 85 is disposed between the first standing portion 73*b* and the second standing portion 74*b*. As a result, an insulating property between the first standing portion 73*b* and the second standing portion 74*b* is enhanced.

More specifically, the first standing portion 73*b* has a facing surface S1 facing the second standing portion 74*b*. The first insulating member 84 is fixed to the facing surface S1 of the first standing portion 73*b* by a fixing member (not shown). Similarly, the second standing portion 74*b* has a facing surface S2 facing the first standing portion 73*b*. The second insulating member 85 is fixed to the facing surface S2 of the second standing portion 74*b* by a fixing member (not shown). The first and second insulating members 84 and 85 are provided in the X direction over substantially the entire length of the first standing portion 73*b* and the second standing portion 74*b* (see FIG. 4). Each of the first and second insulating members 84 and 85 is, for example, an insulating paper, but may be an insulating sheet made of synthetic resin or the like. Note that the converter 12 may have one insulating member sandwiched between the first standing portion 73*b* and the second standing portion 74*b* instead of having the first and second insulating members 84 and 85.

Next, actions of the power conversion unit PUA of the embodiment will be described. In a case where a current flows into the converter 12 from the input transformer 5 side of the power conversion unit PUA, it is assumed that the first switching element SW1*a* and the fourth switching element SW4*a* are in the off state and the third switching element SW3*a* is in the on state. In this case, as shown by the solid line in FIG. 10, the current flows from the first terminal bus 72, passes through the third switching element SW3*a*, passes through the second connection bus 74, passes through the second clamp diode DC2*a*, passes through the neutral point bus 77, and flows into the neutral point C. In this situation, it is assumed that the third switching element SW3*a* is turned to the off state. In the process of turning the third switching element SW3*a* to the off state (called a turn-off process), when the current in the third switching element SW3*a* decreases, the decrease in the current flows from the first terminal bus 72, passes through the second freewheeling diode DF2*a*, flows through the first connection bus 73, passes through the first freewheeling diode DF1*a*, passes through the positive electrode bus 75, and flows into the positive electrode P (see the broken arrow in FIG. 10). That is, commutation is started.

In this case, as shown in FIG. 5, in the turn-off process of the third switching element SW3*a*, a current flows from the third switching module Q3*a*, passes through the second connection bus 74, and flows into the clamp diode module DCMa (arrow A2 in FIG. 5). At this time, a part of the current flowing through the second connecting bus 74 flows through the second standing portion 74*b* in the +X direction. Further, the current flows from the second switching module Q2*a*, passes through the first connection bus 73, flows into the first switching module Q1*a* (arrow A1 in FIG. 5). At this time, a part of the current flowing through the first connecting bus 73 flows through the first standing portion 73*b* in the +X direction.

In the above case, the direction of the current flowing through the first standing portion 73*b* of the first connecting bus 73 and the direction of the current flowing through the second standing portion 74*b* of the second connecting bus 74 are substantially the same. As a result, in the turn-off process of the third switching element SW3*a*, a change in magnetic flux in the vicinity of the first and second connecting buses 73 and 74 becomes relatively small. That is, due to a magnetic coupling caused by the first standing portion 73*b* of the first connecting bus 73 and the second standing portion 74*b* of the second connecting bus 74 facing each other in close proximity to each other, the change in magnetic flux in the vicinity of the first and second connecting buses 73 and 74 is relatively small. Therefore, it is possible to reduce a surge voltage generated in the turn-off process of the third switching element SW3*a*. Eventually, the current flowing through the third switching element SW3*a* disappears, and the current flowing from the first terminal bus 72 flows through the second freewheeling diode DF2*a*.

In the above, the actions of the first standing portion 73*b* and the second standing portion 74*b* have been described by taking the turn-off of the third switching element SW3*a* of the converter 12 as an example, but actions regarding the second switching element SW2*a* of the converter 12, and the second and third switching elements SW2*b* and SW3*b* of the inverter 13 are the same as the actions regarding the third switching element SW3*a* of the converter 12

Figure 11:
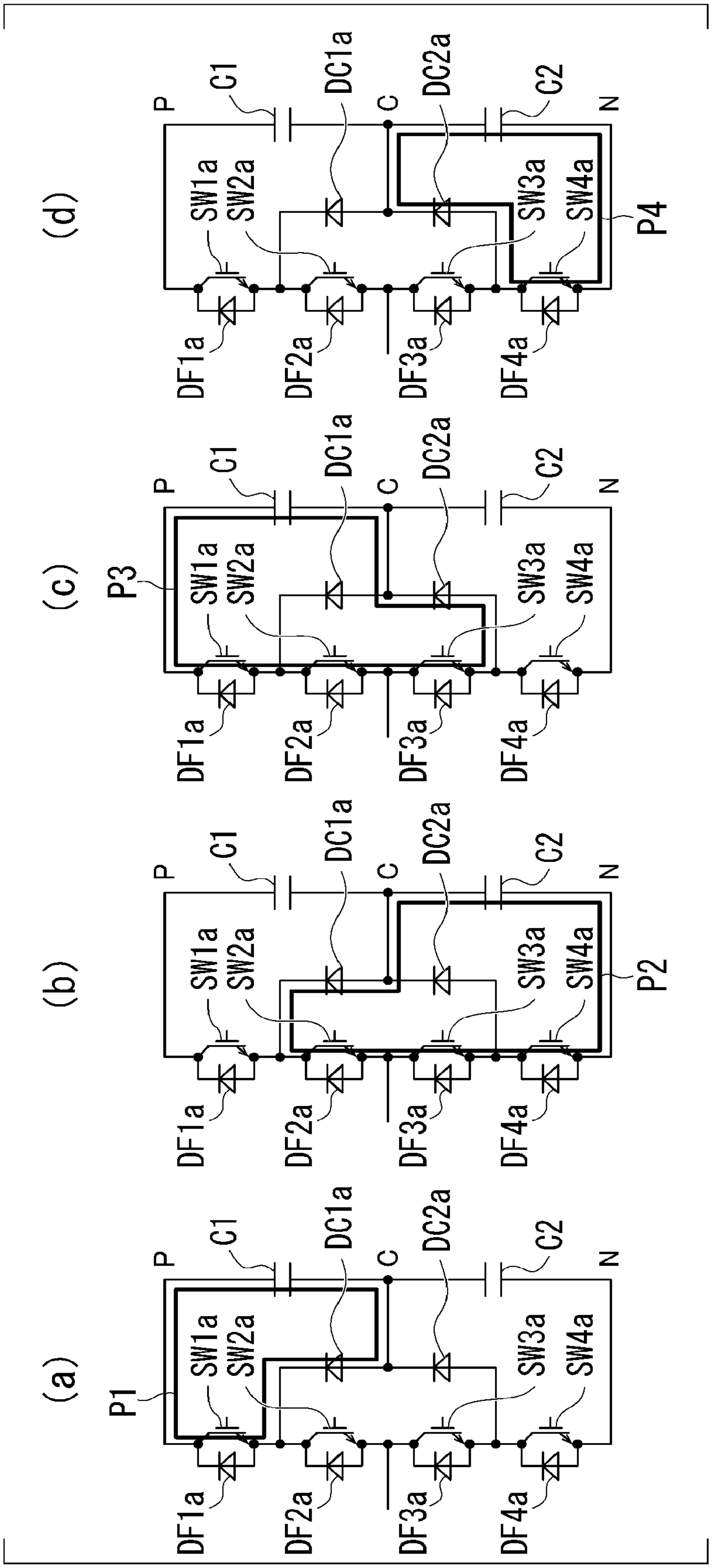
FIG. 11 is a diagram showing a wiring loop which contributes to a surge voltage generated at the turn-off of a switching element of the embodiment.

According to the above configuration, the surge voltage can be reduced. This matter will be described below. FIG. 11 is a diagram showing wiring loops P1, P2, P3, and P4 which contributes surge voltages generated at the time of turn-off of the first to fourth switching elements SW1*a*, SW2*a*, SW3*a*, SW4*a* with respect to the converter 12 (or inverter 13) of the power conversion unit PUA (hereinafter, referred to as "turn-off surge voltage").

(a) in FIG. 11 shows the wiring loop P1 that contributes to the turn-off surge voltage of the first switching element SW1*a*. In this case, the wiring loop P1 is a relatively short path passing through the first switching element SW1*a*, the first capacitor C1, and the first clamp diode DC1*a*.

(b) in FIG. 11 shows the wiring loop P2 that contributes to the turn-off surge voltage of the second switching element SW2*a*. In this case, the wiring loop P2 is a relatively long path passing through the second switching element SW2*a*, the third switching element SW3*a*, the fourth switching element SW4*a*, the second capacitor C2, and the first clamp diode DC1*a*.

(c) in FIG. 11 shows the wiring loop P3 that contributes to the turn-off surge voltage of the third switching element SW3*a*. In this case, the wiring loop P3 is a relatively long path passing through the first switching element SW1*a*, the second switching element SW2*a*, the third switching element SW3*a*, the first capacitor C1, and the second clamp diode DC2*a*.

(d) in FIG. 11 shows the wiring loop P4 that contributes to the turn-off surge voltage of the fourth switching element SW4*a*. In this case, the wiring loop P4 is a relatively short path passing through the fourth switching element SW4*a*, the second capacitor C2, and the second clamp diode DC2*a*.

Here, the longer the wiring loop, the larger the value of the wiring inductance, and the greater the turn-off surge voltage. Therefore, the turn-off surge voltage of the switching module elements SW2*a* and SW3*a* tends to be greater than the turn-off surge voltage of the switching modules SW1*a* and SW4*a*.

Accordingly the drive device 1 of the embodiment includes the following configuration. That is, the drive device 1 includes the first to fourth switching modules Q1, Q2, Q3, and Q4, the first and second clamp diodes DC1 and DC2, and the first and second connection buses 73 and 74. Each of the first to fourth switching modules Q1, Q2, Q3, and Q4 includes a switching element and a package containing the switching element, a first terminal, and a second terminal, the first terminal being electrically connected to the collector of the switching element and exposed to the outside of the package, the second terminal being electrically connected to the emitter of the switching element and exposed to the outside of the package. The first connecting bus 73 includes a first main portion 73*a* and a first standing portion 73*b*. The first main unit 73*a* electrically connects the second terminal of the first switching module Q1 and the first terminal of the second switching module Q2, and is electrically connected to the cathode of the first clamp diode DC1. The first standing portion 73*b* stands up with respect to the first main portion 73*a*. The second connecting bus 74 includes a second main portion 74*a* and a second standing portion 74*b*. The second main portion 74*a* electrically connects the second terminal of the third switching module Q3 and the first terminal of the fourth switching module Q4, and is electrically connected to the anode of the second clamp diode DC2. The second standing portion 74*b* stands up with respect to the second main portion 74*a* and faces the first standing portion 73*b*.

According to such a configuration, for example, in the turn-off process of the second switching element SW2*a* or the third switching element SW3*a*, currents flow in substantially the same direction in the first standing portion 73*b* of the first connecting bus 73 and the second standing portion 74*b* of the second connecting bus 74, and the change in magnetic flux becomes smaller in the turn-off process than in a case where the standing portions 73*b* and 74*b* do not exist. As a result, the turn-off surge voltage can be reduced. Further, since the width of the bus can be extended in directions other than the X direction by providing the presence of the first standing portion 73*b* and the second standing portion 74*b*, an effect of reducing the surge voltage by reducing a stray inductance can be expected.

Figure 12:
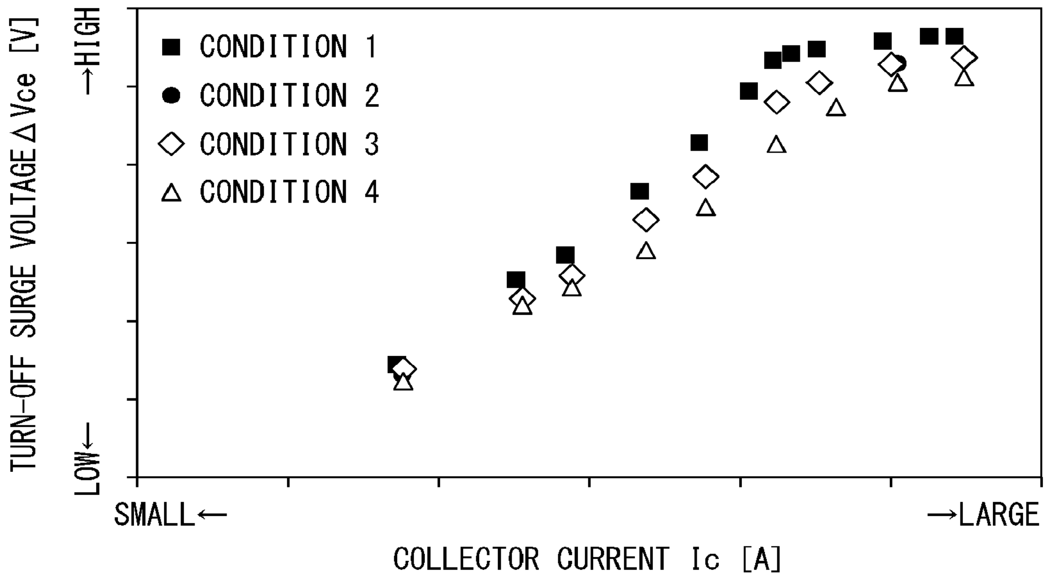
FIG. 12 is a diagram showing an example of an experimental result regarding the turn-off surge voltage of the switching element of the embodiment.

FIG. 12 is a diagram showing an example of experimental results regarding the turn-off surge voltage ΔVce of the third switching element SW3*a*. The ΔVce is a value obtained by subtracting the value of the DC voltage between the positive electrode P and the negative electrode N from the surge voltage applied between the collector and the emitter of the SW3*a* when the SW3*a* is turned off. In FIG. 12, the horizontal axis represents the current value of the collector current 1*c*, and the vertical axis represents the value of the turn-off surge voltage ΔVce of the third switching element SW3*a*. The conditions 1 to 4 of the experiment as follows, in a case where the width of the gap in the Y direction between the first standing portion 73*b* and the second standing portion 74*b* is g, and the standing amounts of the first standing portion 73*b* and the second standing portion 74*b* are H.

Condition 1: g=20 mm, H=0 mm (there is no standing portion)
Condition 2: g=20 mm, H=10 mm
Condition 3: g=20 mm, H=20 mm
Condition 4: g=2 mm, H=10 mm As shown in FIG. 12, it can be confirmed that the turn-off surge voltage is reduced by providing the first standing portion 73*b* and the second standing portion 74*b*. Further, according to FIG. 12, it can be seen that the turn-off surge voltage can be reduced more effectively by reducing the gap g between the first standing portion 73*b* and the second standing portion 74*b*.

In the embodiment, the first standing portion 73*b* of the first connecting bus 73 stands up with respect to the first main portion 73*a* at a position closer to the third switching module Q3 than the edge e1 of the second switching module Q2. The second standing portion 74*b* of the second connection bus 74 stands up with respect to the second main portion 74*a* at a position closer to the second switching module Q2 than the edge e2 of the third switching module Q3. According to such a configuration, the gap g between the first standing portion 73*b* and the second standing portion 74*b* can be made smaller, and the turn-off surge voltage can be further reduced.

In the embodiment, the first main portion 73*a* and the second main portion 74*a* are formed in a plate shape along the X and Y directions. The first main portion 73*a* and the second main portion 74*a* overlap with the package 62 of the second switching module Q2 and the package 63 of the third switching module Q3 in the Z direction, respectively. The first standing portion 73*b* and the second standing portion 74*b* stand up in the Z direction from the end of the first main portion 73*a* and the end of the second main portion 74*a*, respectively. According to such a configuration, the first main portion 73*a* and the second main portion 74*a* can be easily attached to the second switching module Q2 and the third switching module Q3, and the first standing portion 73*b* and the second standing portion 74*b* can reduce the turn-off surge voltage.

In the embodiment, the standing amount of the first standing portion 73*b* in the Z direction is smaller than the width of the first main portion 73*a* in the Y direction.

According to such a configuration, it is possible to curb the first standing portion 73*b* from protruding significantly from the second switching modules Q2. As a result, the size of the device can be reduced.

In the embodiment, the standing amount of the first standing portion 73*b* in the Z direction is 10 mm or less. According to such a configuration, the power conversion unit PUA can be miniaturized and the turn-off surge voltage can be effectively reduced. This matter will be described below.

Figure 13:
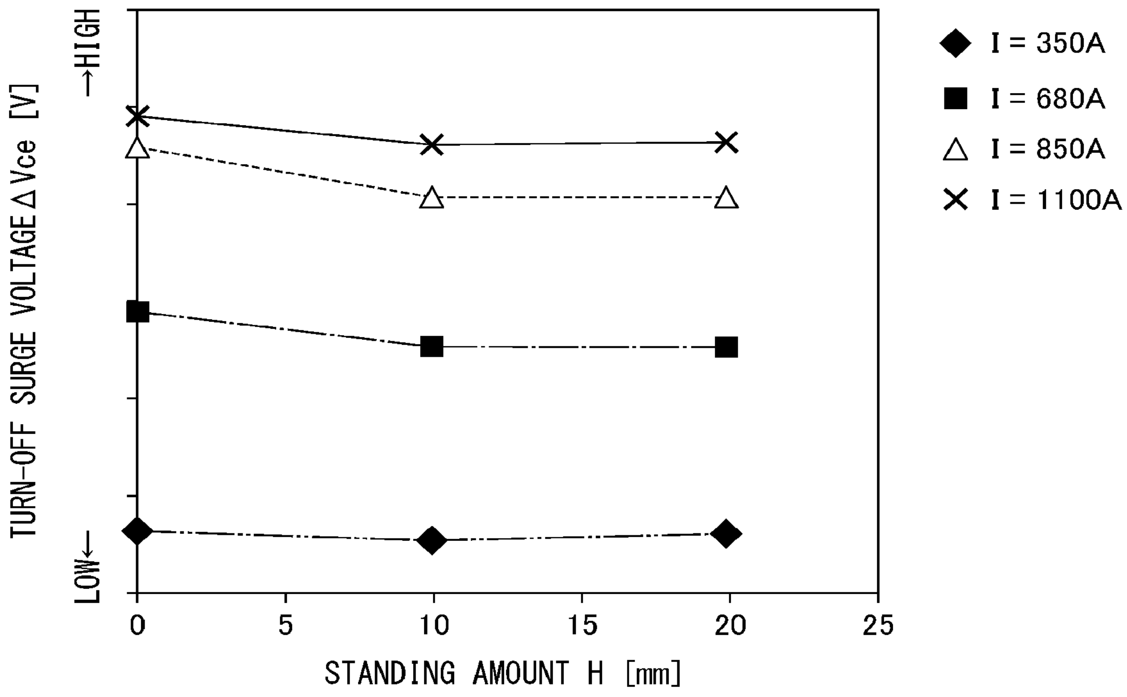
FIG. 13 is a diagram showing an example of an experimental result regarding a relationship between a standing amount of a standing portion and the turn-off surge voltage of the switching element of the embodiment.

FIG. 13 is a diagram showing an example of experimental results regarding the relationship between the standing amount H of the first and second standing portions 73*b* and 74*b* and the turn-off surge voltage of the third switching element SW3*a*. The conditions of this experiment are that the gap g between the first standing portion 73*b* and the second standing portion 74*b* is 20 mm, the voltage VDC due to the DC component is 1550 V, and as the dimensions of each part shown in FIG. 9, W1 is 90 mm, W2 is 70 mm, L1 is 75 mm, and L2 is 200 mm. "I=350 A" in the diagram means that when the collector current at the timing of turn-off is 350 A, "I=680 A" means that when the collector current is 680 A, "T=850 A" means when collector current at the timing of turn-off is 850 A, and "I=1100 A" means when the collector current at the timing of turn-off is 1100 A.

As shown in FIG. 13, when the standing amount H of the standing portions 73*b* and 74*b* is 10 mm or less at various collector currents, it can be seen that the turn-off surge voltage decreases as the standing amount H increases. On the other hand, when the standing amount H of the standing portions 73*b* and 74*b* exceeds 10 mm, it can be seen that the turn-off surge voltage does not decrease even if the standing amount H increases. It may be considered that since most of the current flowing through the first connecting bus 73 and the second connecting bus 74 can flow through the first main portion 73*a* and the second main portion 74*a*, the current is difficult to enter into a tip portion of each of the first standing portion 73*b* and the second standing portion 74*b* which have the standing amount H exceeding 10 mm. Therefore, by setting the standing amount H of the standing portions 73*b* and 74*b* to 10 mm or less, it is possible to achieve both effective reduction of the turn-off surge voltage and miniaturization of the device.

In the embodiment, the second switching module Q2 and at least a part of the clamp diode module DCM are arranged in the X direction. Each of the first standing portion 73*b* and the second standing portion 74*b* extends in the X direction. According to such a configuration, a part of the current flowing between the second switching module Q2 and the first clamp diode DC1 easily enters the first standing portion 73*b*. Similarly, a part of the current flowing between the third switching module Q3 and the second clamp diode DC2 easily enters the second standing portion 74*b*. Therefore, the turn-off surge voltage can be further reduced.

Next, some modifications will be described. In each modification, the configurations other than those described below are the same as the configurations of the above-described embodiment.

First Modification

Figure 14:
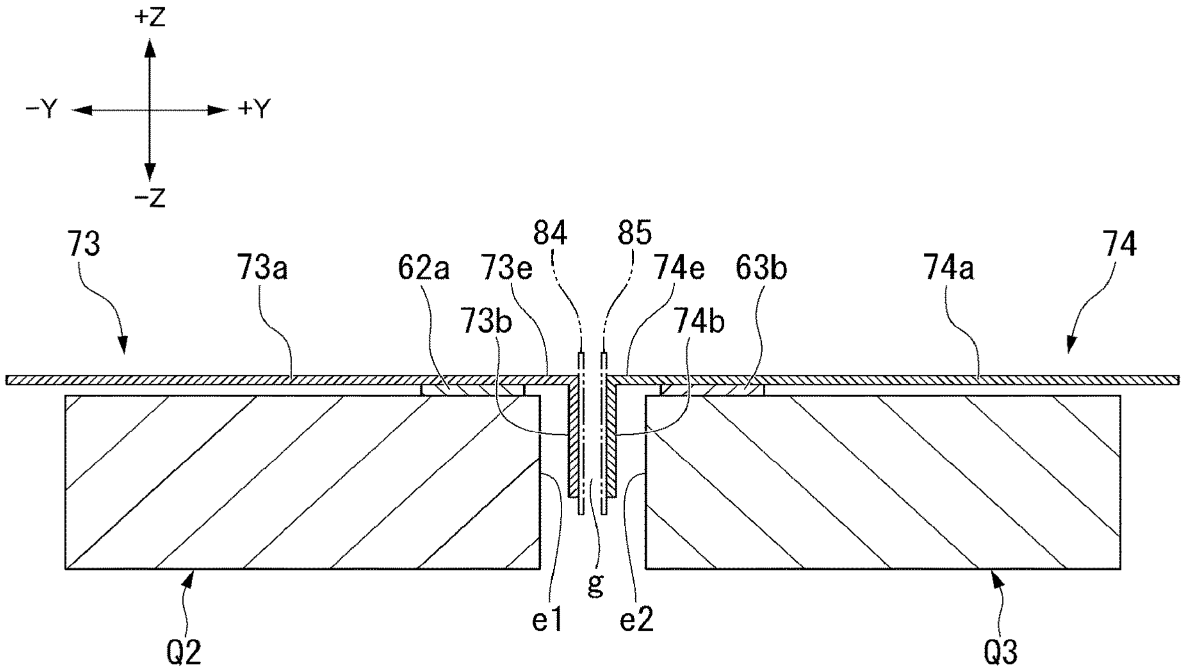
FIG. 14 is a cross-sectional view showing connection buses and switching modules of a first modification of the embodiment.

FIG. 14 is a cross-sectional view showing connection buses 73 and 74 and switching modules Q2 and Q3 according to the first modification. In the first modification, the first standing portion 73*b* is bent in the −Z direction from an end of the first main portion 73*a*. The second standing portion 74*b* is bent in the −Z direction from an end of the second main portion 74*a*. At least a part of the first standing portion 73*b* and at least a part of the second standing portion 74*b* are located between the package 62 of the second switching module Q2 and the package 63 of the third switching module Q3.

According to such a configuration, the first standing portion 73*b* and the second standing portion 74*b* are accommodated by utilizing a space between the second switching module Q2 and the third switching module Q3. Therefore, it is possible to curb the first standing portion 73*b* and the second standing portion 74*b* from protruding significantly in the +Z direction with respect to the second switching module Q2 and the third switching module Q3. As a result, the size of the device can be reduced.

Second Modification

Figure 15:
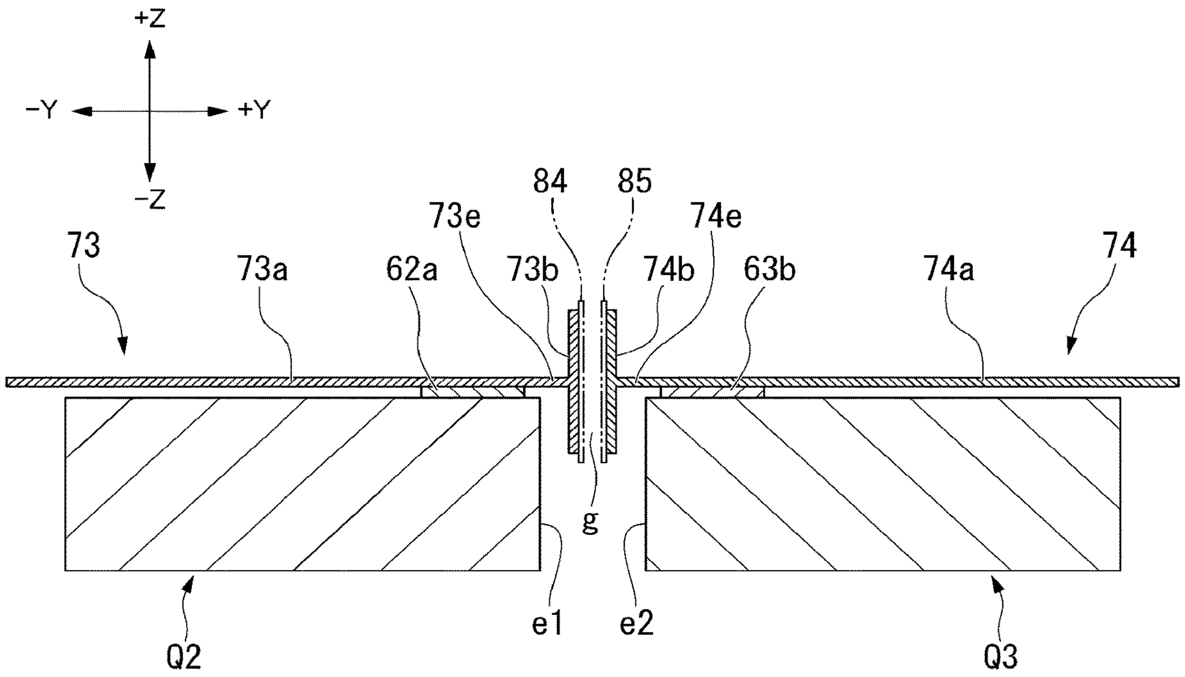
FIG. 15 is a cross-sectional view showing a connection buses and switching modules of a second modification of the embodiment.

FIG. 15 is a cross-sectional view showing connection buses 73 and 74 and switching modules Q2 and Q3 according to the second modification. In the second modification, the first standing portion 73*b* is formed in a T shape that stands up in each of the +Z direction and the −Z direction from an end of the first main portion 73*a*. The second standing portion 74*b* is formed in a T shape that stands up in each of the +Z direction and the −Z direction from an end of the second main portion 74*a*. In the embodiment, at least a part of the first standing portion 73*b* and at least a part of the second standing portion 74*b* are located between the package 62 of the second switching module Q2 and the package 63 of the third switching module Q3.

According to such a configuration, a part of each of the first standing portion 73*b* and the second standing portion 74*b* is accommodated by utilizing a space between the second switching module Q2 and the third switching module Q3. As a result, the size of the device can be reduced. Further, according to the configuration of this modification, the facing area between the first standing portion 73*b* and the second standing portion 74*b* can be increased. As a result, it may be possible to more effectively reduce the change in the magnetic flux around the first connection bus 73*a* and the second connection bus 74*b* in the turn-off process, and to further reduce the turn-off surge voltage.

Third Modification Example

Figure 16:
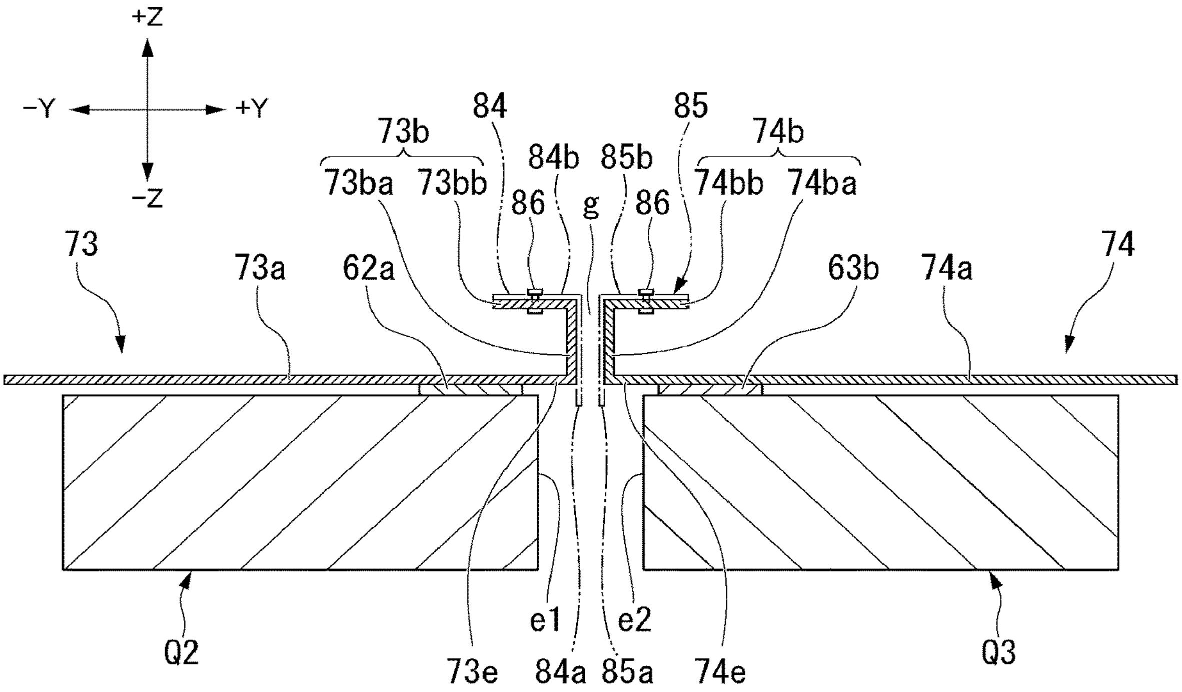
FIG. 16 is a cross-sectional view showing a connection buses and switching modules of a third modification of the embodiment.

FIG. 16 is a cross-sectional view showing the connection buses 73 and 74 and the switching modules Q2 and Q3 according to the third modification. In the third modification, the first standing portion 73*b* includes a first portion 73*ba* and a second portion 73*bb*. The first portion 73*ba* is bent in the +Z direction from an end of the first main portion 73*a* in the +Y direction. The second portion 73*bb* is further bent in the −Y direction from an end of the first portion 73*ba* in the +Z direction so as to be substantially parallel to the first main portion 73*a*.

The first insulating member 84 includes a first portion 84*a* facing the first portion 73*ba* of the first standing portion 73*b* and a second portion 84*b* facing the second portion 73*bb* of the first standing portion 73*b*. The second portion 84*b* is along the X and Y directions. The first insulating member 84 is fixed to the first standing portion 73*b* by attaching the second portion 84*b* of the first insulating member 84 to the second portion 73*bb* of the first standing portion 73*b*. The second portion 84*b* of the first insulating member 84 is fixed to the second portion 73*bb* of the first standing portion 73*b* by, for example, the fixing member 86. The fixing member 86 is, for example, a screw extending in the Z direction, and is attached to the first insulating member 84 in the Z direction to fix the first insulating member 84 to the first standing portion 73*b*.

Similarly, the second standing portion 74*b* includes a first portion 74*ba* and a second portion 74*bb*. The first portion 74*ba* is bent in the +Z direction from an end of the second main portion 74*a* in the −Y direction. The second portion 74*bb* is further bent in the +Y direction from an end of the first portion 74*ba* in the +Z direction so as to be substantially parallel to the second main portion 74*a*.

The second insulating member 85 includes a first portion 85*a* facing the first portion 74*ba* of the second standing portion 74*b*, and a second portion 85*b* facing the second portion 74*bb* of the second standing portion 74*b*. The second portion 85*b* is along the X and Y directions. The second insulating member 85 is fixed to the second standing portion 74*b* by attaching the second portion 85*b* of the second insulating member 85 to the second portion 74*bb* of the second standing portion 74*b*. The second portion 85*b* of the second insulating member 85 is fixed to the second portion 74*bb* of the second standing portion 74*b* by, for example, the fixing member 86. The fixing member 86 is, for example, a screw extending in the Z direction, and is attached to the second insulating member 85 in the Z direction to fix the second insulating member 85 to the second standing portion 74*b*.

According to such a configuration, the fixing member 86 can be attached along the Z direction, and the head or the like of the fixing member 86 does not exist in the gap g between the first standing portion 73*b* and the second standing portion 74*b*. Therefore, as compared with the case where a part of the fixing member 86 exists in the gap g between the first standing portion 73*b* and the second standing portion 74*b*, it is possible to reduce the gap g between the first standing portion 73*b* and the second standing portion 74*b*. As a result, the turn-off surge voltage can be further reduced. Further, according to the configuration of this modification, the fixing member 86 can be attached from the Z direction where there is a relatively large space, and the assemblability of the device can be improved.

Fourth Modification

Figure 17:
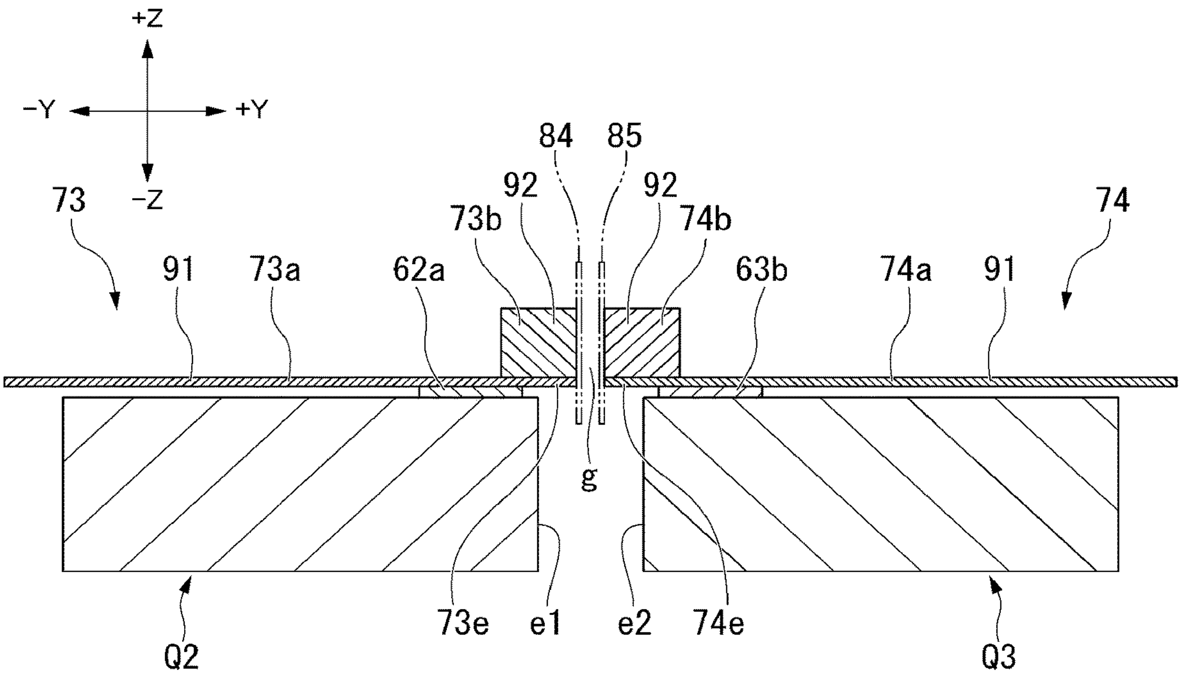
FIG. 17 is a cross-sectional view showing a connection buses and switching modules of a fourth modification of the embodiment.

FIG. 17 is a cross-sectional view showing connection buses 73 and 74 and switching modules Q2 and Q3 according to the fourth modification. In the fourth modification, the first main portion 73*a* is formed of a plate member 91. The first standing portion 73*b* is formed of a conductive member 92 attached to an end of the plate member 91. The conductive member 92 is, for example, a rectangular parallelepiped block member. Similarly, the second main portion 74*a* is formed of another plate member 91. The second standing portion 74*b* is formed of another conductive member 92 attached to an end of the plate member 91.

Even with such a configuration, it is possible to reduce the change in magnetic flux before and after turn-off and reduce the turn-off surge voltage. The conductive member 92 is not limited to the block member, and may be a plate member having an L-shaped-cross section or the like.

Fifth Modification

Figure 18:
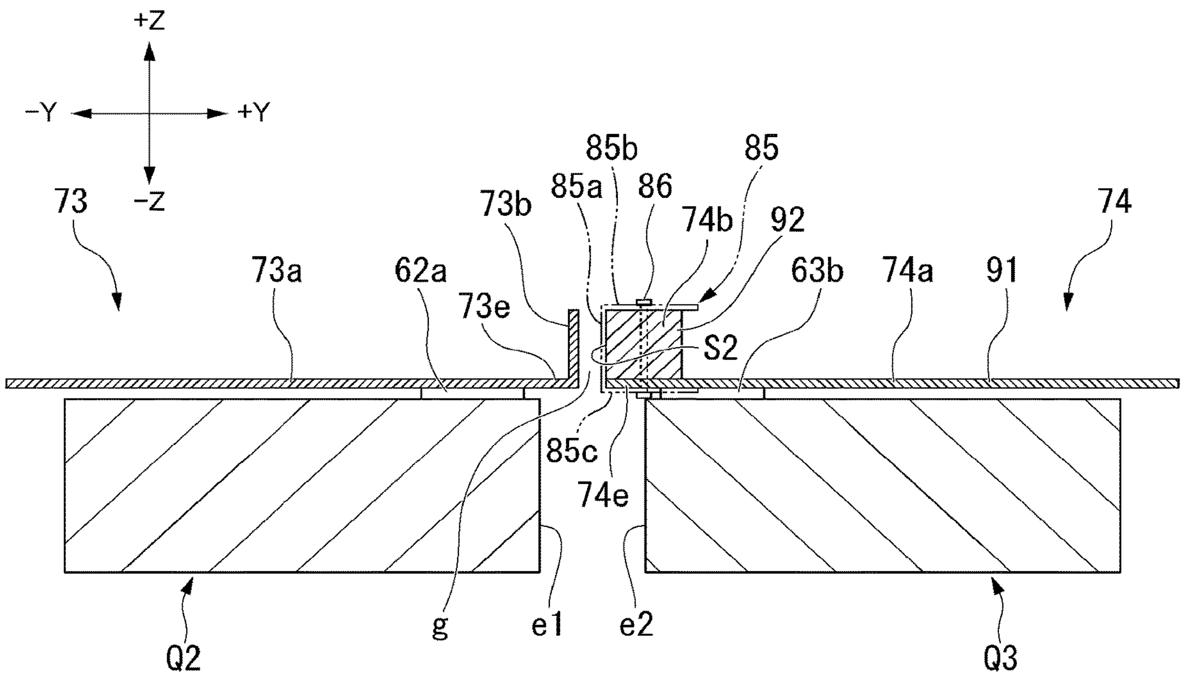
FIG. 18 is a cross-sectional view showing a connection buses and switching modules of a fifth modification of the embodiment.

FIG. 18 is a cross-sectional view showing connection buses 73 and 74 and the switching modules Q2 and Q3 according to the fifth modification. In the fifth modification, the first standing portion 73*b* is formed by bending a part of the plate member forming the first connecting bus 73, as in the above-described embodiment. On the other hand, the second standing portion 74*b* is formed by attaching the conductive member 92 to the plate member 91 as in the fourth modification.

In the fifth modification, the insulating member 85 is attached to the second standing portion 74*b*, and the insulating member 84 attached to the first standing portion 73*b* is omitted. The insulating member 85 includes a first portion 85*a*, a second portion 85*b*, and a third portion 85*c*. The first portion 85*a* overlaps a facing surface S2 of the conductive member 92. The second portion 85*b* overlaps the conductive member 92 from the +Z direction side. The third portion 85*c* overlaps the plate member 91 from the −Z direction side.

In this modification, the fixing member 86 is a fixing member that fixes the conductive member 92 to the plate member 91. The fixing member 86 penetrates, for example, the second portion 85*b* of the insulating member 85, the conductive member 92, the plate member 91, and the third portion 85*c* of the insulating member 85 in the Z direction, and integrally fixes the insulating member 85, the conductive member 92, and the plate member 91. In this modification, the first standing portion 73*b* may also have the same configuration as the second standing portion 74*b*.

According to such a configuration, the insulating member 85 is fixed to the conductive member 92 by the fixing member 86 that fixes the conductive member 92 to the plate member 91. As a result, man-hours for manufacturing the device can be reduced as compared with a case where the fixing member for fixing the insulating member 85 to the conductive member 92 is provided separately from the fixing member for fixing the conductive member 92 to the plate member 91, and it is possible to reduce the cost. Further, according to the configuration of the present modification, as well as the third modification, a part of the fixing member 86 does not exist in the gap g between the first standing portion 73*b* and the second standing portion 74*b*. Therefore, as compared with a case where a part of the fixing member 86 exists in the gap g between the first standing portion 73*b* and the second standing portion 74*b*, it is possible to reduce the gap g between the first standing portion 73*b* and the second standing portion 74*b*. As a result, the turn-off surge voltage can be further reduced. Further, according to the configuration of this modification, the fixing member 86 can be attached from the Z direction where there is a relatively large space, and the assemblability of the device can be improved.

According to at least one embodiment described above, a power conversion device includes first to fourth switching modules, first and second clamp diodes, and first and second bus. The first bus includes a first main portion and a first standing portion provided in the first main portion. The first main portion electrically connects the first switching module and the second switching module, and is electrically connected to the first clamp diode is. The first standing portion is provided in an end of the first main portion. The second bus includes a second main portion and a second standing portion provided in the second main portion. The second main portion electrically connects the third switching module and the fourth switching module, and is electrically connected to the second clamp diode. The second standing portion is provided in an end of the second main portion and faces the first standing portion of the first bus. According to such a configuration, a surge voltage can be reduced.

Although several embodiments of the present invention have been described, the embodiments are presented as examples and are not intended to limit the scope of the invention. The embodiments can be implemented in various other forms, and various omissions, replacements, and changes can be made without departing from the spirit of the invention. The embodiments and the modified examples thereof are included in the scope and gist of the invention and are also included in the invention described in the claims and the equivalents thereof.

1 Drive device (Power converter)
6 Single-phase cell unit
12 Converter
13 Inverter
61, 62, 63, 64, 65 Packages
61*a*, 62*a*, 63*a*, 64*a* First terminals
61*b*, 62*b*, 63*b*, 64*b* Second terminals
73 First connection bus (First bus)
73*a* First main portion
73*b* First standing part
74 Second connection bus (Second bus)
74*a* Second main portion
74*b* Second standing portion
84, 85 Insulating members
86 Fixing member
Q1*a*, Q1*b* First switching modules
Q2*a*, Q2*b* Second switching modules
Q3*a*, Q3*b* Third switching Modules
Q4*a*, Q4*b* Fourth switching modules
DC1*a*, DC1*b* First clamp diodes
DC2*a*, DC2*b* Second clamp diodes

The invention claimed is:

1. A power converter which is a neutral point clamped type power converter, comprising:

a first switching module, a second switching module, a third switching module, and a fourth switching module which are electrically connected in series with each other in this order from a positive electrode to a negative electrode, each of the first switching module, the second switching module, the third switching module, and the fourth switching module including a switching element, a package containing the switching element, a first terminal, and a second terminal, the first terminal being electrically connected to a collector of the switching element and exposed to an outside of the package, the second terminal being electrically connected to an emitter of the switching element and exposed to the outside of the package, the package of the second switching module and the package of the third switching module being arranged side by side;

a first clamp diode, an anode of the first clamp diode being connected to a neutral point of the power converter;

a second clamp diode, a cathode of the second clamp diode being connected to the neutral point of the power converter;

a first bus including a first main portion and a first standing portion, the first main portion electrically connecting the second terminal of the first switching module and the first terminal of the second switching module, the first main portion being electrically connected to a cathode of the first clamp diode, the first standing portion being provided in an end of the first main portion, the first standing portion standing up with respect to the first main portion; and a second bus including a second main portion and a second standing portion, the second main portion electrically connecting the second terminal of the third switching module and the first terminal of the fourth switching module, the second main portion being electrically connected to an anode of the second clamp diode, the second standing portion being provided in an end of the second main portion, the second standing portion standing up with respect to the second main portion, the second standing portion facing the first standing portion of the first bus, wherein the package of the second switching module includes a first edge facing the third switching module, the first main portion of the first bus extends closer to the third switching module than the first edge of the second switching module, the first standing portion of the first bus stands up with respect to the first main portion at a position closer to the third switching module than the first edge of the second switching module, the package of the third switching module includes a second edge facing the second switching module, the second main portion of the second bus extends closer to the second switching module than the second edge of the third switching module, and the second standing portion of the second bus stands up with respect to the second main portion at a position closer to the second switching module than the second edge of the third switching module.

2. The power converter according to claim 1, further comprising:

an insulating member, wherein the first standing portion is a first bent portion bent from the end of the first main portion, the second standing portion is a second bent portion bent from the end of the second main portion, the first bent portion includes a first portion and a second portion, the first portion being bent from the end of the first main portion, the second portion being further bent from an end of the first portion so that the second portion is substantially parallel to the first main portion, and at least a part of the insulating member is disposed between the first bent portion and the second bent portion, and the insulating member is fixed to the second portion of the first bent portion.

3. The power converter according to claim 1, further comprising:

a fixing member; and an insulating member, wherein at least one of the first main portion and the second main portion is formed of a plate member, at least one of the first standing portion and the second standing portion is formed of a conductive member attached to an end of the plate member, the fixing member fixes the conductive member to the plate member, and at least a part of the insulating member is disposed between the first standing portion and the second standing portion, and the insulating member is fixed to the conductive member by the fixing member.

4. A power converter which is a neutral point clamped type power converter, comprising:

a first switching module, a second switching module, a third switching module, and a fourth switching module which are electrically connected in series with each other in this order from a positive electrode to a negative electrode, each of the first switching module, the second switching module, the third switching module, and the fourth switching module including a switching element, a package containing the switching element, a first terminal, and a second terminal, the first terminal being electrically connected to a collector of the switching element and exposed to an outside of the package, the second terminal being electrically connected to an emitter of the switching element and exposed to the outside of the package, the package of the second switching module and the package of the third switching module being arranged side by side;

a first clamp diode, an anode of the first clamp diode being connected to a neutral point of the power converter;

a second clamp diode, a cathode of the second clamp diode being connected to the neutral point of the power converter;

a first bus including a first main portion and a first standing portion, the first main portion electrically connecting the second terminal of the first switching module and the first terminal of the second switching module, the first main portion being electrically connected to a cathode of the first clamp diode, the first standing portion being provided in an end of the first main portion, the first standing portion standing up with respect to the first main portion; and a second bus including a second main portion and a second standing portion, the second main portion electrically connecting the second terminal of the third switching module and the first terminal of the fourth switching module, the second main portion being electrically connected to an anode of the second clamp diode, the second standing portion being provided in an end of the second main portion, the second standing portion standing up with respect to the second main portion, the second standing portion facing the first standing portion of the first bus, wherein the clamp diode module includes a third terminal, the third terminal being electrically connected to the anode of the first clamp diode and exposed to the outside of the package, the third terminal including a third edge of the third terminal, the third edge being closest to the second switching module among edges of the third terminal, the first main portion of the first bus includes a first region and a second region, the first region being located farther than the third edge of the third terminal of the clamp diode module in the third direction when viewed from the first terminal of the second switching module, the second region being located closer than the third edge of the third terminal of the clamp diode module in the third direction when viewed from the first terminal of the second switching module, and the first standing portion of the first bus is not provided in the first region, and the first standing portion of the first bus is provided in at least a part of the second region.

5. A power converter which is a neutral point clamped type power converter, comprising:

a first switching module, a second switching module, a third switching module, and a fourth switching module which are electrically connected in series with each other in this order from a positive electrode to a negative electrode, each of the first switching module, the second switching module, the third switching module, and the fourth switching module including a switching element, a package containing the switching element, a first terminal, and a second terminal, the first terminal being electrically connected to a collector of the switching element and exposed to an outside of the package, the second terminal being electrically connected to an emitter of the switching element and exposed to the outside of the package, the package of the second switching module and the package of the third switching module being arranged side by side;

a first clamp diode, an anode of the first clamp diode being connected to a neutral point of the power converter;

a second clamp diode, a cathode of the second clamp diode being connected to the neutral point of the power converter;

a first bus including a first main portion and a first standing portion, the first main portion electrically connecting the second terminal of the first switching module and the first terminal of the second switching module, the first main portion being electrically connected to a cathode of the first clamp diode, the first standing portion being provided in an end of the first main portion, the first standing portion standing up with respect to the first main portion;

a second bus including a second main portion and a second standing portion, the second main portion electrically connecting the second terminal of the third switching module and the first terminal of the fourth switching module, the second main portion being electrically connected to an anode of the second clamp diode, the second standing portion being provided in an end of the second main portion, the second standing portion standing up with respect to the second main portion, the second standing portion facing the first standing portion of the first bus; and a neutral point bus electrically connected to at least the anode of the first clamp diode, wherein the first main portion includes a region that is covered with the neutral point bus and a region that is not covered with the neutral point bus, and the first standing portion is not provided in the region that is covered with the neutral point bus in the first main portion, and the first standing portion is provided in at least a part of the region that is not covered with the neutral point bus in the first main portion.

* * * * *